US010905094B2

(12) United States Patent
Salem et al.

(10) Patent No.: US 10,905,094 B2
(45) Date of Patent: Feb. 2, 2021

(54) SYSTEMS AND METHODS OF VIDEO MONITORING FOR VIVARIUM CAGES

(71) Applicant: The United States of America, as represented by the Secretary, Dept. of Health and Human Services, Rockville, MD (US)

(72) Inventors: Ghadi Salem, Rockville, MD (US); John U. Dennis, Rockville, MD (US); James B. Mitchell, Rockville, MD (US); Thomas J. Pohida, Rockville, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 1385 days.

(21) Appl. No.: 14/901,130

(22) PCT Filed: Jun. 30, 2014

(86) PCT No.: PCT/US2014/044923
§ 371 (c)(1),
(2) Date: Dec. 28, 2015

(87) PCT Pub. No.: WO2014/210601
PCT Pub. Date: Dec. 31, 2014

(65) Prior Publication Data
US 2016/0150758 A1 Jun. 2, 2016

Related U.S. Application Data

(60) Provisional application No. 61/841,064, filed on Jun. 28, 2013.

(51) Int. Cl.
*A01K 29/00* (2006.01)
*A01K 1/03* (2006.01)

(52) U.S. Cl.
CPC ............ *A01K 1/031* (2013.01); *A01K 29/005* (2013.01)

(58) Field of Classification Search
CPC . A01K 1/00; A01K 1/03; A01K 1/031; A01K 11/00; A01K 11/006; A01K 29/00; A01K 29/005
See application file for complete search history.

(56) References Cited

U.S. PATENT DOCUMENTS 3,063,413 A * 11/1962 Fuller .................... A01K 1/031
119/417
3,225,738 A * 12/1965 Palencia ................ A01K 1/031
119/455
(Continued)

FOREIGN PATENT DOCUMENTS

WO   WO-2011124209 A2 * 10/2011 ............. A01K 1/031
WO   WO-2012049349 A1 *  4/2012 ............. A01K 1/031
WO      2014/210601 A1   12/2014

OTHER PUBLICATIONS

International Search Report, International Application No. PCT/US2014/044923, dated Oct. 23, 2014; 4 pgs.
(Continued)

*Primary Examiner* — Monica L Barlow
*Assistant Examiner* — Michael A. Fabula
(74) *Attorney, Agent, or Firm* — Polsinelli PC

(57) ABSTRACT

The System for Continuous Observation of Rodents in Home-cage Environment (SCORHE) was developed to quantify activity levels and behavior patterns for mice housed within a home cage that, optional, may be disposed in a commercial ventilated cage rack. The SCORHE home-cage in-rack design provides daytime and night-time monitoring with the stability and consistency of the home-cage environment. The dual-video camera custom hardware design makes efficient use of space, does not require home- (Continued)

cage modification, and is animal facility user-friendly. In various embodiments, a software application integrates the two video streams to extract several mouse activity measures.

18 Claims, 18 Drawing Sheets

(56) References Cited

U.S. PATENT DOCUMENTS

| | | | |
|---|---|---|---|
| 3,464,388 A * | 9/1969 | Stout | A01K 1/031 119/418 |
| 3,540,413 A * | 11/1970 | Castaigne | A01K 1/031 119/421 |
| 4,206,720 A * | 6/1980 | Ruggeri | A01K 1/031 119/458 |
| 4,216,741 A * | 8/1980 | Moss | A01C 1/02 119/420 |
| 4,337,726 A * | 7/1982 | Czekajewski | A01K 1/031 119/421 |
| 4,448,150 A * | 5/1984 | Catsimpoolas | A01K 29/005 119/455 |
| 4,526,133 A * | 7/1985 | LoMaglio | A01K 1/031 119/419 |
| 4,574,734 A * | 3/1986 | Mandalaywala | A01K 1/031 119/421 |
| 4,690,100 A * | 9/1987 | Thomas | A01K 1/031 119/419 |
| 4,989,545 A * | 2/1991 | Sheaffer | A01K 1/031 119/419 |
| 5,220,882 A * | 6/1993 | Jenkins | A01K 1/03 119/420 |
| 5,577,464 A * | 11/1996 | Wellington | A01K 1/03 119/452 |
| 5,797,350 A * | 8/1998 | Smith | A01K 1/03 119/454 |
| 6,257,171 B1 * | 7/2001 | Rivard | A01K 1/031 119/419 |
| 6,810,832 B2 | 11/2004 | Ford | |
| 7,487,744 B1 * | 2/2009 | Goldberg | A01K 1/031 119/453 |
| 2002/0069834 A1 * | 6/2002 | Deitrich | A01K 1/031 119/419 |
| 2004/0131254 A1 | 7/2004 | Liang et al. | |
| 2004/0144328 A1 * | 7/2004 | Bonner | A01K 1/03 119/455 |
| 2004/0263625 A1 | 12/2004 | Ishigami et al. | |
| 2005/0066910 A1 * | 3/2005 | Tecott | A01K 1/031 119/421 |
| 2005/0076854 A1 * | 4/2005 | Passno | A01K 1/03 119/500 |
| 2005/0092257 A1 * | 5/2005 | Uchiyama | A01K 1/031 119/455 |
| 2005/0257748 A1 | 11/2005 | Kriesel et al. | |
| 2007/0236356 A1 * | 10/2007 | Zhang | A01K 1/031 340/573.2 |
| 2007/0256643 A1 * | 11/2007 | Coiro | A01K 1/031 119/457 |
| 2007/0265816 A1 * | 11/2007 | Elmer | A61B 5/1122 703/11 |
| 2008/0087229 A1 * | 4/2008 | Gabriel | A01K 1/031 119/417 |
| 2008/0087231 A1 * | 4/2008 | Gabriel | A01K 1/031 119/455 |
| 2008/0152192 A1 * | 6/2008 | Zhu | G06K 9/00771 382/103 |
| 2009/0002496 A1 * | 1/2009 | Esmaeili | A01K 1/031 348/207.1 |
| 2009/0095697 A1 * | 4/2009 | Gabriel | B62B 3/006 211/206 |
| 2009/0293815 A1 * | 12/2009 | Coiro, Sr. | A01K 1/031 119/417 |
| 2010/0111359 A1 * | 5/2010 | Bai | G06K 9/00335 382/103 |
| 2010/0282179 A1 * | 11/2010 | Ho | A01K 1/03 119/455 |
| 2011/0082574 A1 * | 4/2011 | Pachet | A01K 15/02 700/94 |
| 2012/0085291 A1 * | 4/2012 | Conger | A01K 1/0047 119/419 |
| 2012/0085293 A1 * | 4/2012 | Owens | A01K 1/03 119/455 |
| 2014/0251228 A1 * | 9/2014 | Jensen-Jarolim | A01K 29/005 119/421 |
| 2014/0305378 A1 * | 10/2014 | Lever | A01K 1/03 119/417 |
| 2014/0345536 A1 * | 11/2014 | Usui | A01K 1/0245 119/452 |
| 2015/0223433 A1 * | 8/2015 | Navawongse | A01K 29/005 119/421 |
| 2015/0237833 A1 * | 8/2015 | Florczak | A01M 31/002 340/573.2 |
| 2015/0254602 A1 * | 9/2015 | Hammelbacher | G06Q 10/087 705/28 |

OTHER PUBLICATIONS

International Preliminary Report on Patentability and Written Opinion, International Application No. PCT/US2014/044923, dated Dec. 29, 2015; 10 pgs.
Supplementary European Search Report from related European Patent Application No. 14816642.4, dated Feb. 7, 2017; 5 pgs.
Office Action from related Australian Patent Application No. 2014302060, dated Apr. 21, 2017; 7 pgs.
De Visser et al., "Novel approach to the behavioural characterization of inbred mice: automated home cage observations," Genes, Brain and Behavior, 2006, pp. 458-466, vol. 5.
Salem et al., "SCORHE: A novel and practical approach to video monitoring of laboratory mice housed in vivarium cage racks," Behavior Research Methods, 2015, pp. 235-250, vol. 47, No. 1.
Zarringhalam et al., "An open system for automatic home-cage behavioral analysis and its application to male and female mouse models of Huntington's disease," Behavioural Brain Research, 2012, pp. 216-225, vol. 229, No. 1.
Zurn et al., "Video-Based Tracking and Incremental Learning Applied to Rodent Behavioral Activity Under Near-Infrared Illumination," IEEE Transactions on Instrumentation and Measurement, 2007, pp. 2804-2813, vol. 56, No. 6.

* cited by examiner (a)

(b)

SYSTEMS AND METHODS OF VIDEO MONITORING FOR VIVARIUM CAGES

RELATED APPLICATIONS

The present application claims priority to U.S. Provisional Application No. 61/841,064, entitled "Systems and Methods of Video Monitoring for Vivarium Cage Racks," filed on Jun. 28, 2013, the entire contents of which are herein incorporated by reference.

GOVERNMENT INTEREST STATEMENT

The present subject matter was made with U.S. government support. The U.S. government has certain rights in this subject matter.

FIELD

The present disclosure relates generally to a system suitable for performing continuous observation and monitoring of organisms. More specifically, the present disclosure relates to systems, device networks, algorithms, and methods for monitoring the animals using video and processing the video to gather information on the behavior of the animals.

BACKGROUND

Laboratory animals are commonly used in a wide variety of research areas. Often the research requires observing the animals for extended periods of time. There is increasing interest in automated systems for video-based monitoring of laboratory animals. Currently there are a number of commercial available monitoring systems such as those Pheno-Typer (Noldus Information Technology), Home Cage Environment (CleverSys Inc), ANY-maze Cage (Stoelting Co), and PhenoRack (ViewPoint Life Sciences Inc). In addition, a number of commercial available video processing software applications are available, such as EthoVision XT, HomeCageScan, ANY-maze, and VideoTrack for extracting behavioral data from the captured video. The non-invasive nature of video-based monitoring systems combined with the precision and granularity of behavioral measures afforded by such systems enables more advanced and thorough studies in comparison to basic systems that use a running wheel or photo beam detectors.

Current video-based monitoring systems often require the laboratory animals to be moved from their home cages and placed in special enclosures for monitoring. Studies have shown the importance of monitoring mice in their home-cage to eliminate the stress-induced effects caused by transplanting the animals into specialized test environments. In addition, many of the present systems rely on manual observation or scoring to augment the data gathered from video observation. This increases the potential for processing variations and errors caused by human interaction. Thus, there remains a need for a robust and automated video monitoring system that allows for continuous long-term observation of the animals in their home-cage environments with a minimal requirement for manual data gathering, if any.

BRIEF SUMMARY

The present disclosure relates generally to a system and methods suitable for performing continuous observation and video-based monitoring on animals, such as mice, in a cage rack system. In one embodiment, the system for video-based monitoring includes an enclosure compatible with many existing cages and rack systems, such that the enclosures can be used to monitor laboratory animals in their home cages within the rack system.

The present disclosure also relates to systems and methods of video processing to identify and analyze the behavior of the animals in their home cages. In particular, the systems and methods can be used to study multiple animals in a single home cage. The system includes an application executable by processor to automatically detect and track multiple animals. The application also carries out methods to resolve occlusions, including non-severe occlusions, which may arise in a home cage containing multiple animals.

DETAILED DESCRIPTION

Figure 1:
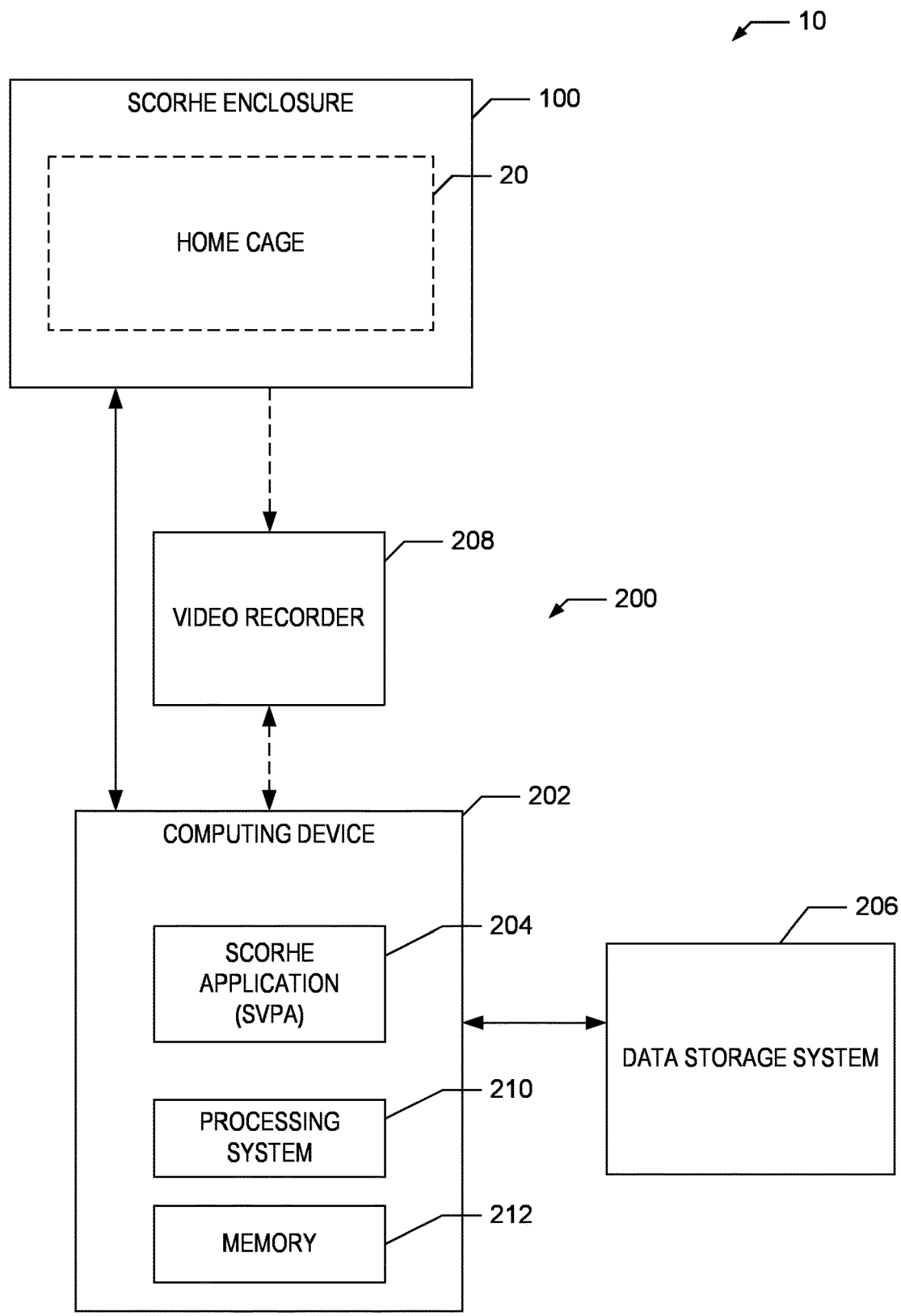
FIG. 1 is a block diagram of a video-based monitoring system according to one embodiment.

The video-based monitoring system referred to herein as a System for the Continuous Observation of Rodents in Home-cage Environment ("the SCORHE") allows researchers to quantify activity levels and behavior patterns for mice. In one aspect, the SCORHE is used for mice housed in commercially available ventilated cage racks. The SCORHE may be used to observe mice in home cages not disposed in a cage rack (e.g. a home cage placed on table top). Although the SCORHE system is described herein for monitoring mice, the system is suitable for monitoring other laboratory animals. Another aspect of the SCORHE is that it facilitates both daytime and nighttime monitoring and recording. In various embodiments, the SCORHE includes one or more SCORHE enclosures to receive a home cage. In various embodiments, each enclosure uses a dual-video camera arrangement to efficiently use the available space in the home-cage without requiring modification of the home cage. In other embodiments, more than two cameras may be used.

The design of the SCORHE allows for seamless integration with ventilated vivarium racks, thus setting it apart from current home-cage video monitoring systems. The SCORHE addresses many problems associated with many other mouse monitoring methods, including circadian rhythm disruption, acclimation periods, lack of nighttime measurements, and short monitoring periods. The SCORHE enclosure's diminutive footprint permits populating a rack with a large number of SCORHE enclosures without requiring extra vivarium real estate. In various embodiments, the SCORHE enclosure is low cost, and offers the lowest size ratio (i.e., ratio of monitoring system volume to home-cage volume) relative to commercially available systems. In addition, no animal facility staff training or hardware setup time is required to use the SCORHE. As video monitoring and associated interpretive software becomes more prominent in mainstream methods for analyzing mice behavior, the advantages of the SCORHE would help in overcoming the hurdles of large-scale, long-term, wide-ranging, and automatic use of automated monitoring.

Various video processing algorithms of the SCORHE used for both singly- and doubly-housed mice videos are well suited for robust mouse activity detection, characterization, quantification, and temporal evaluation. For example, when monitoring singly housed mice, the time duration measures for mouse placement within the cage (i.e. on-floor, on-hind legs, and off-floor) had an overall classification accuracy of approximately 94%. Similarly, the distance travelled measure had an accuracy of at least 90% when the mouse is on the cage ceiling and floor.

Similarly, processing algorithms for doubly housed mice were qualitatively validated by observing the nocturnal nature in the circadian rhythm, the diminished activity levels in the sedated mice, and the increased activity levels of mice over-expressing the HMGN1 gene. The accuracy of the SCORHE video analysis methods is indicative of the SCORHE's ability to provide detailed mouse behavior characterization.

The video analysis algorithms developed are highly automated, thereby eliminating the need for manual observation or scoring, which avoids any processing variation caused by human factors or multiple scorers In various aspects, the SCORHE design eliminates three factors that typically impede the wide spread use of video monitoring. These factors include the cost incurred to procure custom cages and racks, the requirement for additional space in the vivarium or laboratory, and the cost of additional staff to operate and maintain the monitoring equipment.

In contrast to the SCORHE seamless integration into a commercial cage-rack system, many commercially available systems require custom cages such as the PhenoTyper and ANY-maze Cage. However, such customized racks are typically non-ventilated and have a reduced cage-capacity as compared to standard commercial racks. These factors impede large-scale use of automated monitoring in existing vivariums. However, unlike other available systems, SCORHE does not reduce the number of cages which can be accommodated by the rack, nor require custom rack mechanical modifications. When compared with other systems, the SCORHE mechanical design results in two key advantages: negligible footprint and compatibility with ventilated racks.

Typically, rack-based ventilation systems not only maintain proper air-circulation in individual cages, the systems also aim to prevent contamination across cages by exhausting spent air out of the whole room. Hence, operation in ventilated racks facilitates long-term studies by eliminating bio security concerns, preventing disease transmission to or from any adjacent cages. The SCORHE is configured to monitor laboratory animals, including mice, housed in commercially available home-cages placed in compatible ventilated vivarium racks while also maintaining the full cage-rack functionality intended by the manufacturer. In particular, the SCORHE is configured to fit in a wide-variety of ventilated rack-based cage systems that are in use at a number of research facilities.

In another aspect, the SCORHE is configured to collect mouse activity and behavior profiles over one or more 24-hour diurnal cycles while preserving photoperiodic entrainment to the circadian cycle. In particular, one embodiment of the SCORHE uses near infrared (NIR) illumination at a wavelength of approximately 850 nm, for example. NIR illumination is preferred, as it does not significantly affect the circadian rhythm of the mice. Moreover, systemic physiological effects associated with exposure to low levels of NIR illumination have not been reported. By using NIR illumination, the SCORHE operates independently of the ambient light cycle that occurs in vivarium rooms. For example, as explained more fully below, the SCORHE includes a door with windows that allow the ambient light in the vivarium rooms to illuminate the cage.

The data generated by these algorithms complements any optional data collected by other means (e.g., physiological signals, weight/size, food consumption) to provide a more extensive phenotype of the mice, and/or a more rigorous assessment of the effect of novel treatments. These measurements could also function as a streamlined screening tool, i.e., to provide a quick comparative determination (with a previously recorded baseline) of the viability of a mouse to undergo further treatment or experimentation.

FIG. 1 is a block diagram of one embodiment of the SCORHE 10. The SCORHE 10 is configured and dimensioned to enclose or engage a home cage 20 for monitoring mice living therein. The SCORHE system includes a SCORHE enclosure 100 in communication with a video processing system 200 that includes a computing device 202 and an optional video recorder 208 to monitor and record video of mice in the home cage 20.

Figure 2:
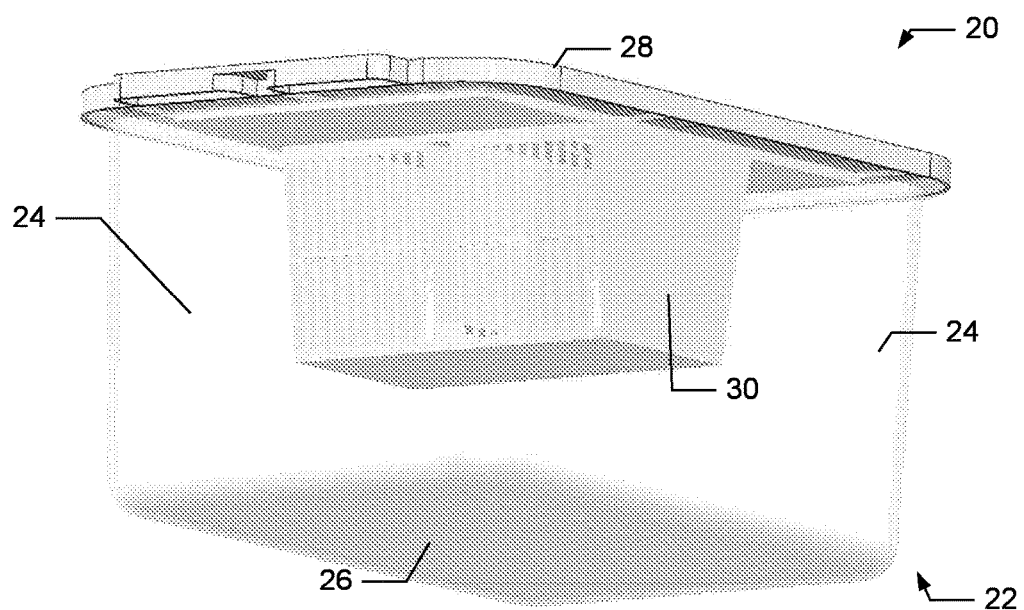
FIG. 2 is an illustration of an example home cage according to one embodiment.

A home cage 20, shown in FIG. 2, is used herein to refer to an enclosure where a mouse or other animal is housed. Typically, the home cage 20 is where the mouse sleeps and includes devices for providing food and water to the mouse. The home cage 20, is, for example any cage that is commonly used in vivarium rack systems. In one embodiment, the cage 20 includes a generally transparent surface 22 that may define one or more walls 24 and a bottom surface 26 of the cage. The cage 20 may also include a wire-bar lid 28 that is engaged to the walls 24 and a food hopper 30. In various examples, the home cage 20 also includes a water bottle (not shown). By way of example and not limitation, one particular cage 20 that may be used with the SCORHE is the Model 5 Expanded Mouse Cage, which is typically used with the caging systems produced by Thoren.

Figure 3:
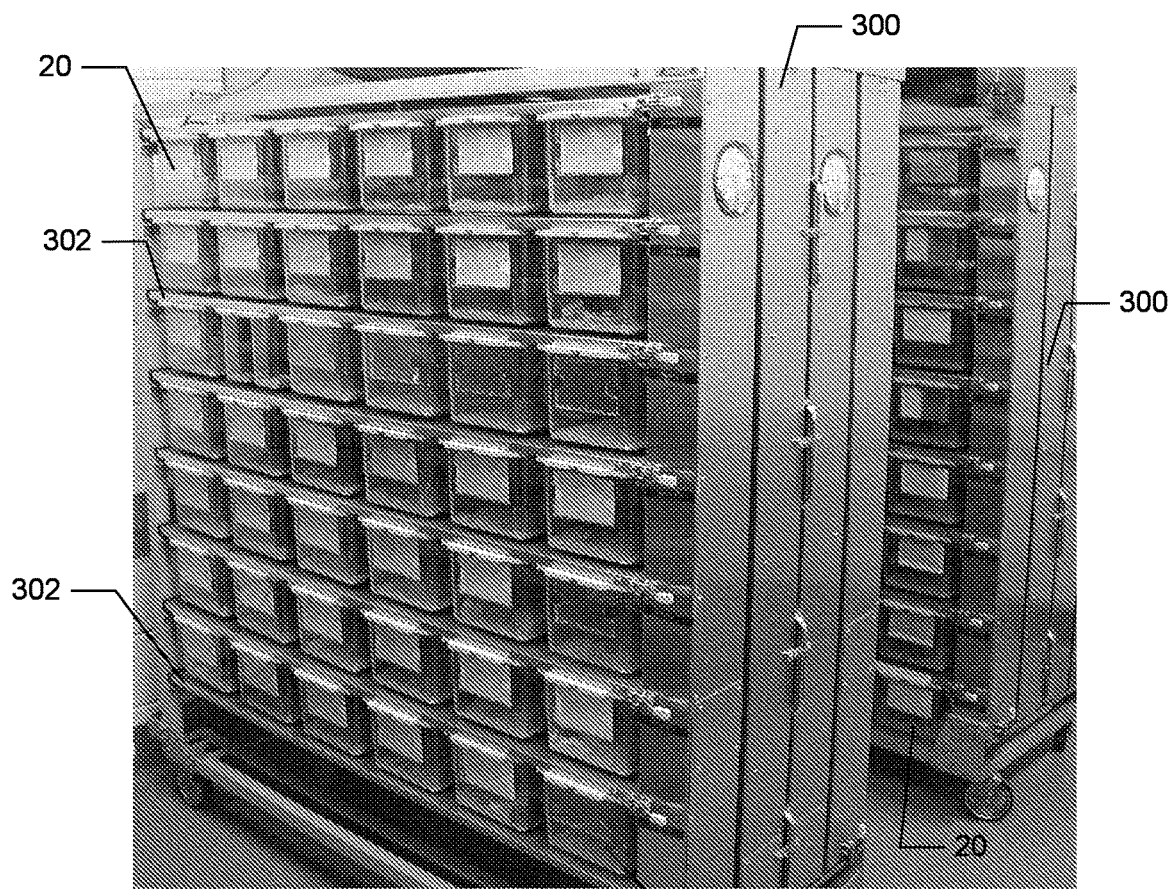
FIG. 3 is a photograph of a vivarium cage rack system according to one embodiment.
Figure 4:
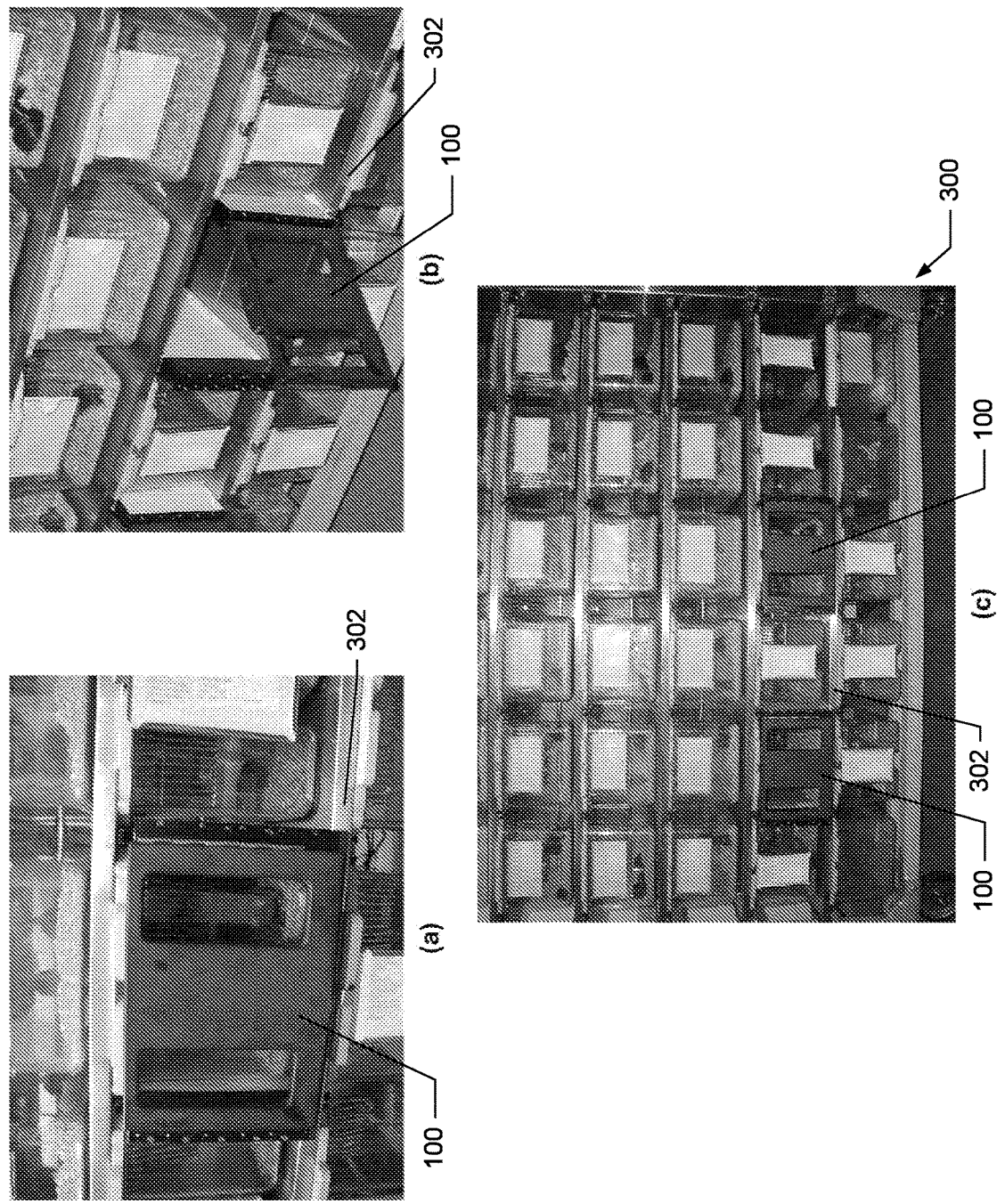
FIG. 4 is a photograph of a video-based monitoring enclosures positioned within a cage rack system according to one embodiment.

FIG. 3 depicts a ventilated cage rack system 300 that is compatible with the SCORHE 10 to increase the functionality of the rack system while also while maintaining the efficiency of using a readily-available multi-cage ventilated rack. For example, the rack system shown is the Maxi-Miser Rack Systems by Thoren Caging Systems Inc., of Hazleton, Pa. When used with the rack system, the SCORHE 10 easily fits in the space between adjacent home cages 20, as well as, fitting within the space between the cages on opposing sides of the double bay rack system 300. The SCORHE 10 integrates seamlessly with the cage racks without hindering access to the cages. The SCORHE enclosure 100 can simply be slid into the rack system 300 by guiding the side-panels of the enclosure (i.e., the NIR illumination panels 142, as shown in FIGS. 5A-B, 6, and 9) into space that normally separate (i.e. unused open space) neighboring cages. In one aspect, the SCORHE enclosure 100 may sit on the shelves 302 of the rack system 300. In another aspect, the SCORHE enclosure may sit on a bench or tabletop for observing animals without requiring a cage rack. FIG. 4 depicts embodiments of the SCORHE enclosure 100 as placed in a rack system, such as the rack system 300.

Within each home cage 20, the wire-bar lid 28 and food hopper 30 may present an obstacle for a typical video monitoring system that uses a single camera. As such, various embodiments of the SCORHE enclosure 100 employ two or more cameras to reduce system blind spots caused by the hanging food basket. One such embodiment of the SCORHE enclosure 100 is shown in FIGS. 4-5.

Figure 5A:
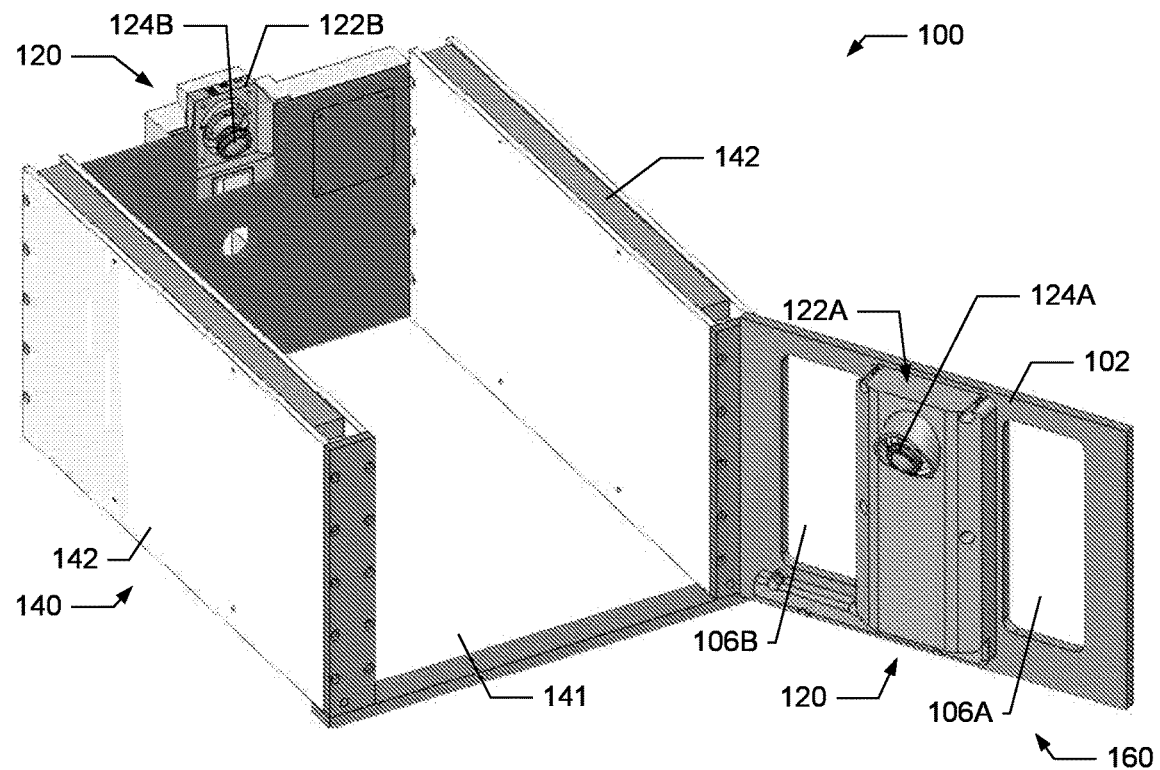
FIG. 5A is an illustration of a video-based monitoring enclosure according to one embodiment.
Figure 5B:
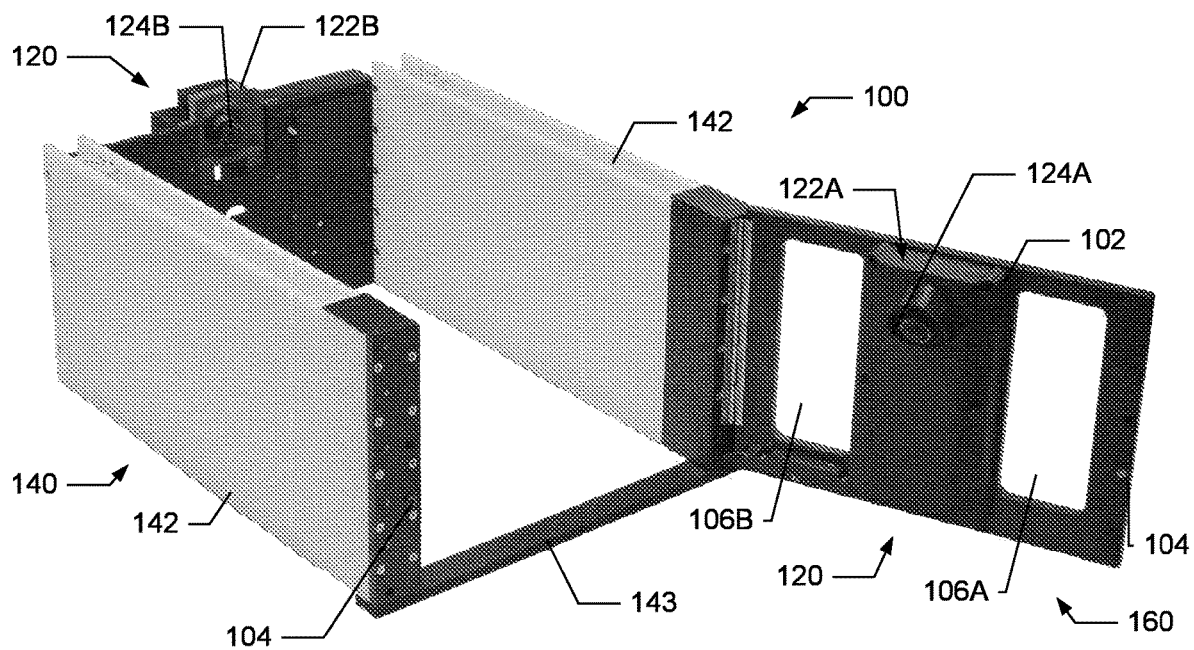
FIG. 5B is a photograph of video-based monitoring enclosure according to one embodiment.

FIG. 5A depicts a three-dimension computer aided design (3D-CAD) model of one embodiment of a SCORHE enclosure 100. A photograph of another embodiment of the SCORHE enclosure 100 is shown in FIG. 5B. The SCORHE enclosure 100 is compatible with a variety of cage-rack systems, provides consistent cage illumination, and is capable of capturing video of nearly the full cage volume.

In one aspect, the SCORHE enclosure 100 is constructed of a, preferably lightweight, rigid material to withstand handling. The materials are also selected to address any illumination anomalies (i.e., reflections, shadows) For example; the selected materials include translucent acrylic that serves to diffuse the light sources. Without the translucent acrylic, the light sources may be visible in the captured image as bright spots with darker regions in between the spots. The use of acrylic eliminates this issue and provides a uniform diffuse light source.

In various embodiments, the SCORHE enclosure 100 includes a dual-camera system 120, a NIR illumination system 140, a bottom surface 141, and a door assembly 160, as shown in FIG. 5A. Other embodiments of the SCORHE enclosure 100 do not include a bottom surface, but have a frame support 143 that joins the sidewalls of the enclosure. In addition, each SCORHE enclosure includes a power supply (e.g. a 12V DC supply) (not shown) and at least one port and/or wire (not shown) to transmit the output from the dual-camera system 120 to the computing device 202, as shown in FIG. 1, via a wired or wireline connection. Alternatively, the SCORHE enclosure 100 may include one or more wireless transmitters and receivers to transmit or receive data wirelessly.

Cage Access

In one embodiment, the door assembly 160 of the SCORHE enclosure 100 includes a hinged door 102 with a magnetic latch 104 to allow for insertion and removal of the home cage 20 from the rack 300 without removing the enclosure from the rack system. As shown in FIGS. 5A-B, the door 102 incorporates two large window cutouts 106A-B to ensure the ambient light levels in the cage 20 coincide with the diurnal cycling of light in a vivarium room. In addition, the window cutouts 106A-B enable animal care staff to conduct routine visual inspections of the mice in the cage without disrupting the monitoring of the SCORHE 10. In various embodiments, the window cutouts 106A-B may include a transparent or translucent material. In another embodiment, the cutouts 106A-B may be omitted, such that the NIR illumination system 140 provides both the day and night illumination the rather than relying on the room's ambient light. The bottom surface 141 of the SCORHE enclosure 10 may be entirely transparent, translucent, or opaque in various embodiments. In other embodiments, the bottom surface 141 may include combinations of transparent, translucent, or opaque portions.

The Dual-Camera System

The dual camera system 120 includes at least two cameras 122A-B positioned to provide video analysis of at least the entire lower portion of the cage 20. In particular, the cameras 122A-B are suitable for performing video analysis when two or more mice are housed in the cage 20, as well as to overcome the challenges of video analysis associated with non-uniform bedding material (not shown). In many aspects, the ability to monitor and analyze behavior for multiple animals housed in the same cage is desired, as there is a widely held belief that the solitary housing of mice adversely affects the overall profile of mouse activity. In addition, the SCORHE 10 is well suited to capture video data related to the social interactions between two animals housed in the same enclosure.

The positioning of the cameras 122A-B provides a bird's-eye view of the cage. In contrast to many existing systems, which are often limited to top-down and/or side-views of the cage 20, the cameras 122A-B are better suited to capture video that provides sufficient mouse shape detail, improve the accuracy of tracking multiple mice, and facilitate detection of mice in images despite frequent changes in bedding position and appearance.

For example, cameras that capture only a side-view of the cage are typically placed at a mid-point of the cage height and have an image plane that is parallel to the sidewall of the cage. While the resulting video may have sufficient detail to resolve fine-grained behavior such as grooming, the video processing for side-view systems is more difficult due to occlusions and/or background variations caused by the displacement of bedding material by the mice. In addition, a greater challenge arising from side-view camera systems is the difficulty of developing behavior analysis methods when multiple animals are caged. More specifically, when using side-view cameras, the frequency and/or severity of the occlusion of one mouse by another adversely impacts video processing and the development of automated behavior detection methods. As a result, nearly all existing processing methods for single camera side-view systems are effectively limited to solitary housed animals. However, one known attempt to analyze video of multiple mice in a side-view system is limited to tracking the position and contour of the mice in a 1,000-frame sequence (approximately thirty-three seconds of video) rather than analyzing behavior over a longer period.

Cameras positioned to capture a top-down perspective are generally more robust to account for changes in the bedding material and a informative for tracking the positions of the mice, however, they typically offer less detail for detecting micro-movements and behaviors, such as grooming. In additional, the mechanical constraints of operating in a ventilated rack system with typical commercial cages often precludes the use of a camera with a top-down perspective alone or in conjunction with a side-view camera.

The positioning and the vantage point of the SCORHE cameras 122A-B captures more video detail for behavior analysis than top-down systems, and has a greater ability to resolve occlusions of the mice than side-view systems. In particular, the cameras 122A-B are aligned in opposing directions at the approximate mid-point of the corresponding side.

To minimize the overall depth of the video capture system and therefore, minimize the space required by the hardware of the SCORHE enclosure 100, between opposing cages in the double-bay rack 300 (i.e., two cages situated back-to-back in rack shown in FIG. 3), the cameras 122A-B are remote-head cameras, in one embodiment. By way of example and not limitation, the cameras 122A-B may be remote-head cameras having part number STC-HR170 by Sensor Technologies America of Carrollton, Tex. In another example, the cameras 122A-B may be digital video cameras, such as but not limited to web cameras and Internet Protocol (IP) cameras, that allow for the collection of video data over a data network, such as the Internet or a local-area network, among others. In one aspect, the digital video cameras may be connected to the data network via an Ethernet connection or any other suitable connection. In one embodiment, the cameras 122A-B are module cameras, such as those configured to connect to a Raspberry PI circuit-board computer, to acquire video and stream the data directly to a computing device via a network. This digital video data may be stored at the computing device and/or processed in real time.

Figure 7:
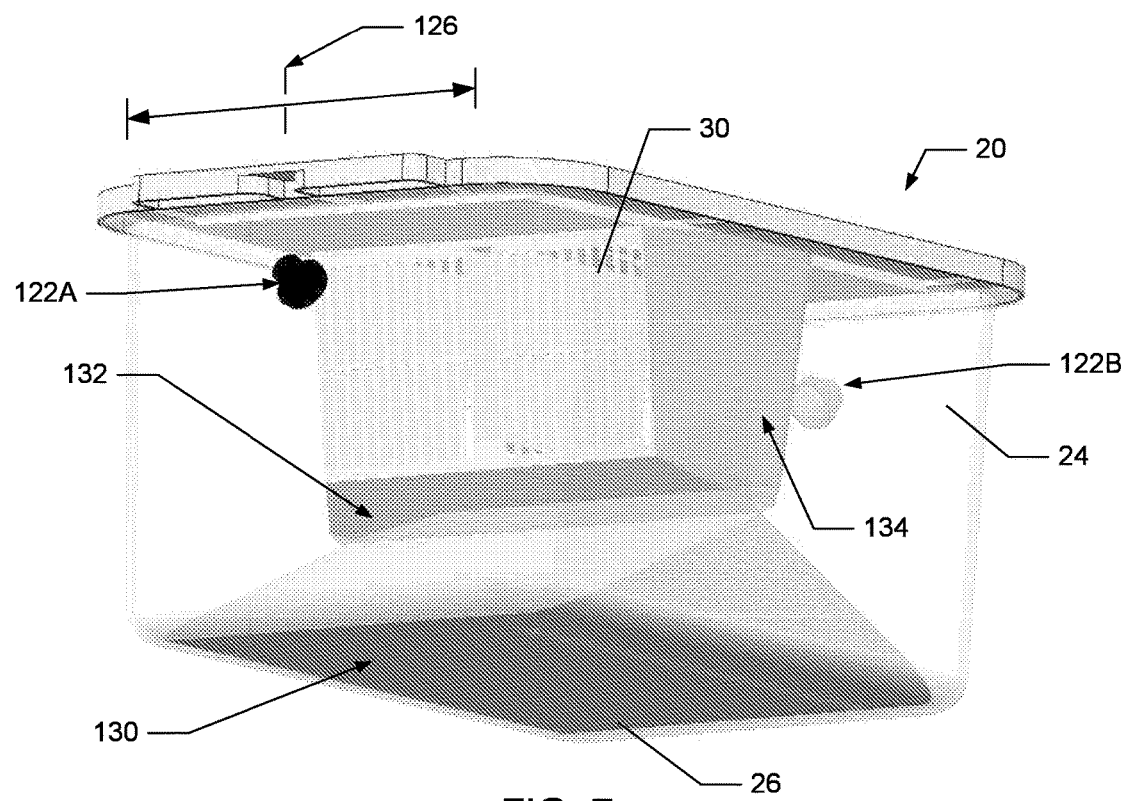
FIG. 7 is an illustration of areas within the home cage that overlap or are not visible by a camera of the video-based monitoring system cage according to one embodiment.

In various embodiments, the rear camera 122B will occupy a limited space behind the SCORHE enclosure 100, while allowing another cage to be fully inserted in the opposing rack cage slot. Similarly, the front camera 122A has a thin profile, afforded by the use of the remote-head camera, and therefore keeps the SCORHE enclosure 100 from inconveniently protruding too far forward and acting as an obstruction to vivarium staff working around the rack 300. FIG. 7 is a illustration of the overlapping region 130 of the cage 20 that is visible to both SCORHE cameras 122A-B, as well as an occluded region directly beneath the center of the hopper 30, generally indicated as 132, and the occluded regions on both sides of the cage, generally indicated as 134, each of which is the partial volume defined by the cage walls 24 and the side of the food hopper 30. The pairing of the cameras 122A-B and each respective lens 124A-B, in conjunction with the placement and orientation of the cameras, limits the area not visible by the dual-camera system 120 to the three relatively small spatial regions 132-134.

In various embodiments, the cameras 122A-B are each paired with a respective lens 124A-B. In some embodiments, the space constraints necessitate placing the lenses 124A-B close (e.g. <3 mm) to the front and rear walls 24 of the cage 20. In these embodiments, the close proximity of the lenses 124-A-B to the cage 20 mandated the use of fisheye lenses. By way of example and not limitation, the lenses 124A-B may be fisheye lenses having part number DSL215B-NIR by Sunex Inc., of Carlsbad, Calif. The fisheye lenses 124A-B provide a panoramic view sufficiently wide to capture images of the outer edges of the entire cage volume. Moreover, the close proximity of the lenses to the cage surfaces is advantageous as this minimizes reflections off the front and rear cage walls 24 that may be captured by the dual-camera system 120.

The lenses 124A-B are placed near the top of the cage front and rear walls 24 at or near the mid-point of the cage width, as indicated by 126. The lenses 124A-B are positioned with a downwards tilt of in a range between approximately 20 degrees and 40 degrees from a plane parallel to the bottom surface 26. In one aspect, this elevated lens configuration minimizes any blockage of the camera field of view due to bedding displacement (e.g., a pile of bedding caused by the mice walking, foraging, or digging).

In another aspect, the elevated lens configuration reduces both the likelihood and severity of occlusions in cages containing two or more mice. Research as shown that, while in a home-cage, the mouse or mice spend a majority of the time on the floor or bottom surface of the cage 20. The elevated lens configuration increases the amount of floor area visible to each camera 122A-B, thereby reducing the probability of the mice overlapping relative to the plane of the camera field of view.

Figure 8:
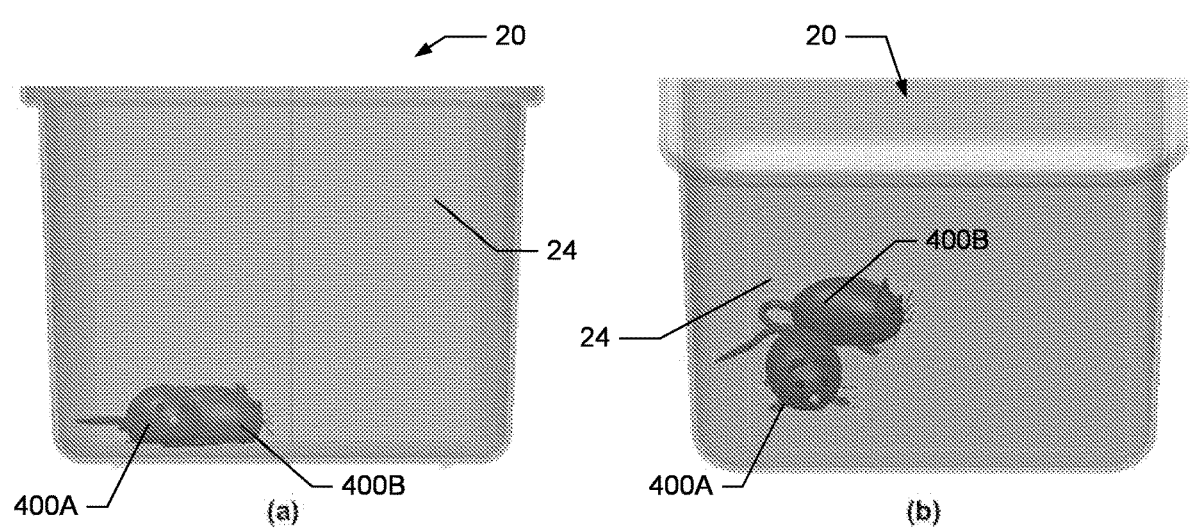
FIG. 8 is an illustration of the field of view for different camera placements according to one embodiment.

Moreover, as shown in FIG. 8, even when the mice 400A-B are touching or otherwise overlapping on the cage floor, the field of view for each for each of the elevated lens 124A-B includes more of the outline of the mice. For example, (a) illustrates a partial occlusion of one mouse 400B by another mouse 400A as seen by a camera/lens pair positioned at a lower position on the wall 24 of the cage 20 (e.g. approximately at the mid-point along a vertical height of the cage in a plane parallel to the cage bottom). As shown, the position of the mice 400A-B results in a severe occlusion that is difficult to resolve. In contrast, (b) depicts the mice A-B in the same positions as shown in (a), however, the elevated and tilted configuration of the camera/lens pair (similar to that of the SCORHE dual-camera system 120, lessens the severity of the occlusion, thereby increasing the success of video processing methods and algorithms to effectively detect and resolve the occlusion.

In various embodiments, mice or other animals observed by the SCORHE system 10 may be marked to aid in identifying and distinguishing the animals when housed together. Any suitable marking method may be used. In one embodiment, the mice 400A-B, as shown in FIG. 8, may be marked using non-invasive methods. By way of example, the mice 400A-B may be fitted with ear-tags (not shown). In one aspect, the ear-tags include indicia that be text based or image based. The indicia may be human-readable and/or machine-readable. In one embodiment, the indicia is sized to be readily detectable by the cameras 122A-B, such that the mice 400A-B may be automatically identifiable and trackable during video processing.

The Near-Infrared (NIR) Illumination System

The SCORHE dual-camera system 120 can record mouse activity for the entire duration of the diurnal cycle due, at least in part, to the NIR illumination system 140. Studies have shown that the NIR wavelength band (i.e. from about 800 nm to about 2500 nm) is not visible to rodents and does not disrupt the mouse circadian rhythm. Although video data may be captured using the ambient light in the vivarium, the ambient light conditions are typically inconsistent due to many factors, including but not limited to the physical location of the cages, shadows, and temporal variations. The NIR illumination system 140, therefore allows the SCORHE 10 to capture data without the reliance on ambient light.

Figure 9:
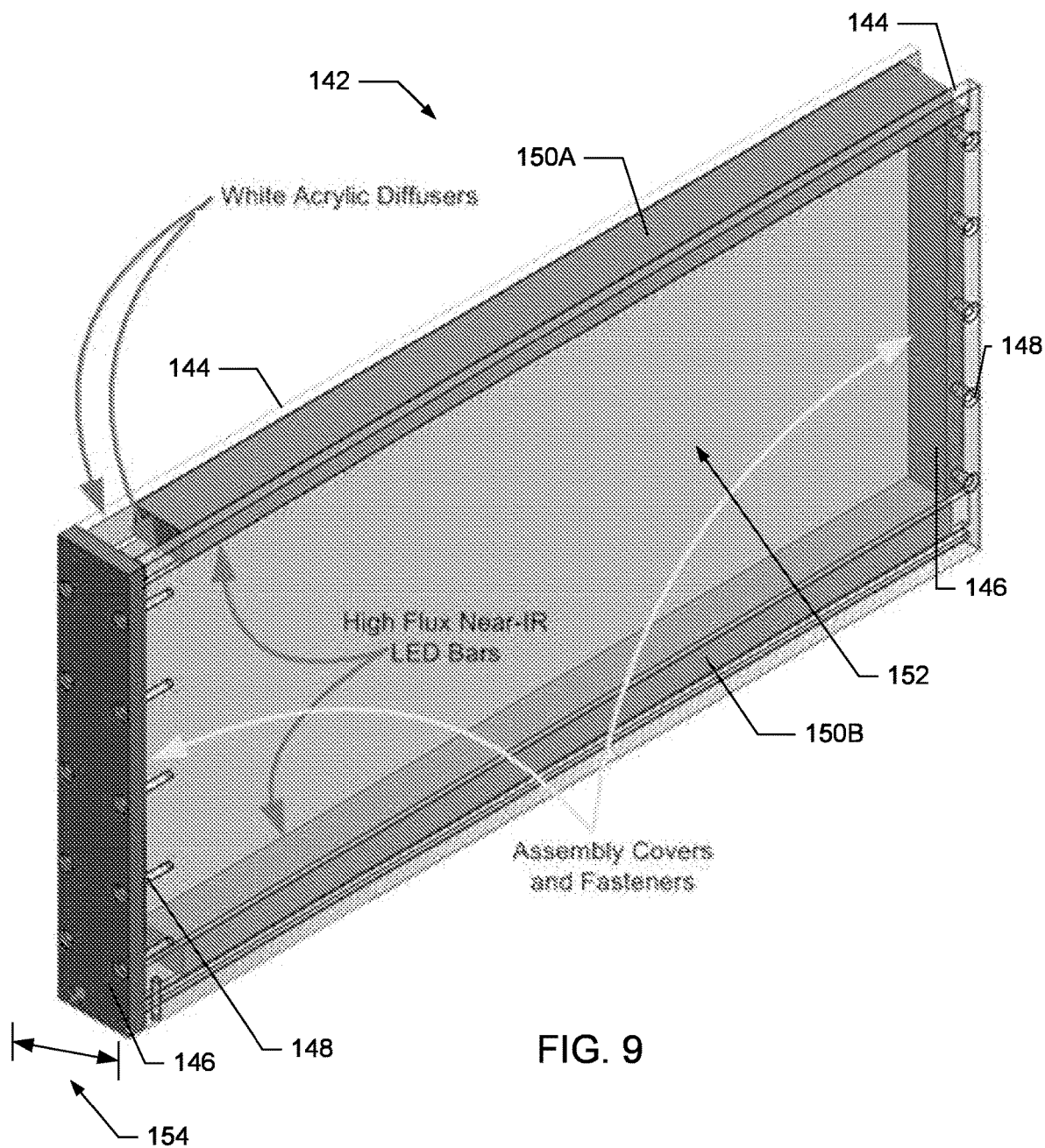
FIG. 9 is an illustration of an illumination panel assembly according to one embodiment.

In one embodiment, the NIR illumination system 140 includes a pair of NIR panel assemblies 142, with each panel making up opposing sidewalls of the SCORHE enclosure 100. As shown in FIG. 9, each NIR panel assembly 142 includes at least one light source positioned between a parallel pair of diffusers 144. Each NIR panel assembly 142 also includes light-sealing covers 146 and suitable fasteners 148 to complete the assembly.

Any suitable NIR light source may be used. For example, in one embodiment, the light source is a pair of high-flux light emitting diode (LED) strips 150A-B, such as those produced by Environmental Lights of San Diego, Calif., having part number IR12-850. The LED strips 150A-B are positioned at opposite ends of the panel assembly 142 and oriented to illuminate the space 152 between the strips. In one embodiment, the LED strips 150A-B may be positioned at the top and bottom of the panel 142, while in another embodiment, the LED strips are positioned at the sides of the panel. In another embodiment, the NIR light source is an array of LEDs. The array is associated and in communication with a printed circuit board (PCB) for controlling the duration and intensity of the LED illumination.

In either embodiment, the LED strips 150 are sandwiched between a parallel set of diffusers 144. In various embodiments, the diffusers are white acrylic sheets approximately ¼ inch thick. The acrylic sheets diffuse the light source to provide sufficiently uniform illumination to the cage interior. The covers 146 seal the open ends between the diffusers 144, while the fasteners 148 secure the diffusers, covers, and light sources together to form the panel assembly 142.

Figure 6:
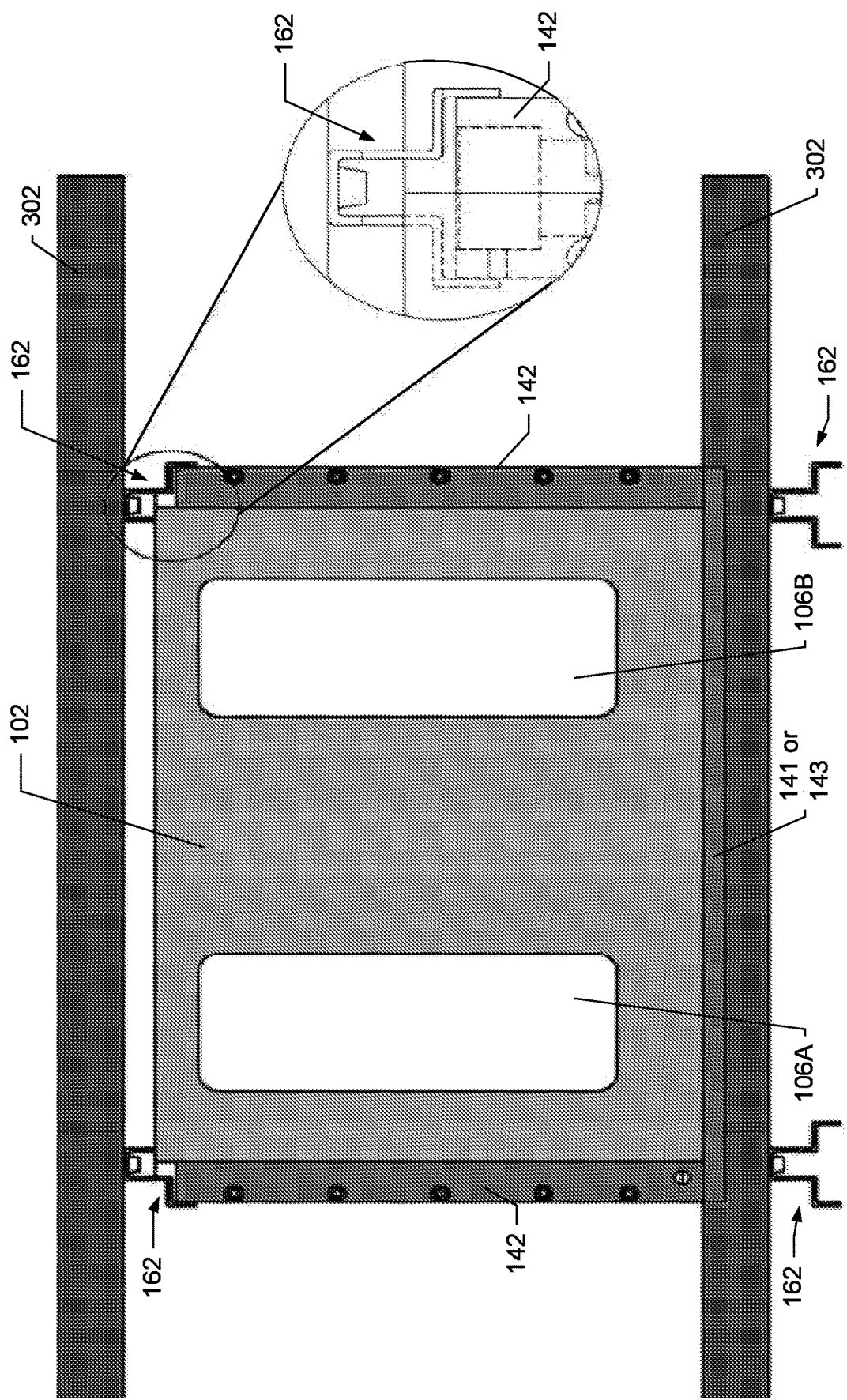
FIG. 6 is an illustration of a video-based monitoring enclosure engaged to rails of a cage rack system according to one embodiment.

To minimize any illumination gradients within the cage interior, the light source(s) preferably span approximately the entire length of both sides of the SCORHE enclosure 100 and therefore the cage 20. The total panel thickness, indicated by 154, is less than the distance between adjacent cages 20 when placed side-by-side in consecutive rack cage slots. As such, the NIR panel thickness 154 is limited to ensure that the rack can still be fully loaded to with cages 20. In one embodiment, the NIR panel assemblies 142 fit within the channels (i.e., unused open space) that normally separate neighboring cages. In another embodiment, as shown in FIG. 6, the NIR panel assemblies may fit within rails 162, already existing or retro-fitted to the shelves 302 of a cage rack system.

In various embodiments, the SCORHE cameras 122A-B do not include any NIR blocking filters, such as those commonly found in visible spectrum cameras. It is desired that the SCORHE cameras 122A-B are sensitive to NIR light in order to capture video having sufficient brightness and contrast for reliable segmentation during video processing.

In one embodiment, a light blocking filter that filters out light in the range visible by humans was installed between the lenses 124A-B and their respective cameras 122A-B. By way of example, one such light-blocking filter is the Kodak Wratten Infrared Filter, having part number NT54-518 and produced by Edmund Optics of Barrington, N.J. Blocking the visible spectrum limits the effective illumination for dual-camera system 120 to the uniform illumination provided by the NIR illumination system 140, thus ensuring near consistent brightness in the captured video throughout both dark and light cycles in the vivarium. As such, the light level during the diurnal-cycle in the vivarium have no effect on the video output from the SCORHE enclosure 100. Therefore, in various embodiments, a single video-processing algorithm or variable (e.g., image threshold level) can be used regardless of the time when the video was captured.

Video Processing

As shown in FIG. 1, the SCORHE enclosure 100 is in communication with the computing device 202. Data captured by the dual camera system 120 of the SCORHE enclosure 100 may be transmitted to the computing device 202 for video processing in a number of ways. For example, the video data may be streamed directly to the computing device 202 for processing in near real-time. In another example, the video data may be recorded and stored on a computer readable medium, including but not limited to a hard disk drive, a flash drive, random-access memory, or other data storage device or system and processed later. In yet another example, the video data is recorded and stored at a video recorder device 208, including digital video and audio for subsequent processing.

By way of example and not limitation, the video recorder device 208 where video data received from each SCORHE enclosure 100 is recorded may be a 4-channel digital video recorder (DVR). In this example, the output of the DVR is then digitized and saved to a computer readable medium via a suitable software application. Subsequent processing may then be performed at the computing device 202 executing one or more applications, including but not limited to MathWorks' Matlab and Simulink applications.

The SCORHE Application

Figure 10:
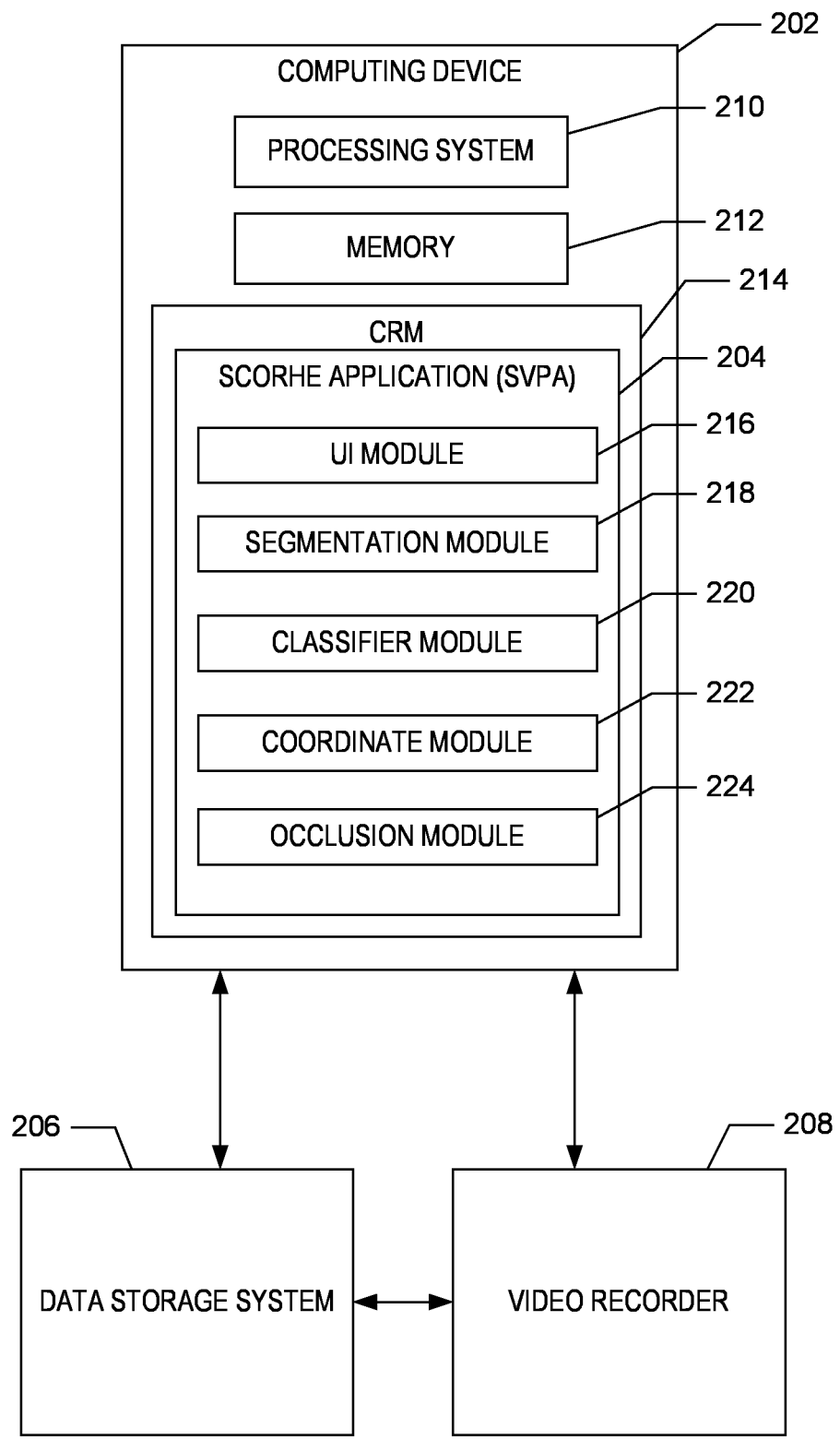
FIG. 10 is a block diagram of a computing device for video processing according to one embodiment.

As shown in FIGS. 1 and 10, the SCORHE 10 includes at least one computing device 202 executing a SCORHE Video Processing application ("SVPA") 204 for processing video data. The computing device 202 is communicatively connected and/or linked to a data storage system 206 and a video recorder device 208. In one embodiment, the data storage system 206 and a video recorder device 208 may be integrated with the computing device 202. In other embodiments, the computing device 202 may be connected to one or more other computing devices including mobile devices through a communication network (not shown), including the Internet or other wired or wireless communication.

The computing device 202 is a computer or computing device that includes one or more processors or processing systems 210 and memory 212 and executes the SVPA 204 to process video data captured from the SCORHE enclosures 100. According to one aspect, the SVPA 204 manages the collection of, storage of, and access to video data stored on the data storage system. In another aspect, the SVPA 204 is also used to manage the collection and recording of the video data.

According to one aspect, the computing device 202 includes a computer readable medium ("CRM") 214 configured with the SVPA 204, as shown in FIG. 10. The SVPA 204 includes instructions or modules 216-224 that are executable by the processing system 210 to process and analysis the video data.

The CRM 214 may include volatile media, nonvolatile media, removable media, non-removable media, and/or another available medium that can be accessed by the computing device 202. By way of example and not limitation, the CRM 214 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

The modules of the SVPA 204 include, but are not limited to a user-interface module 216, a segmentation module 218, a classifier module 220, a coordinate module 222, and an occlusion reasoning module 224. Although identified as individual modules for the purposes of illustration, the functionality of the modules 216-224 may be combined and/or overlap with the functionality of other modules. In addition, the modules 216-224 may be located on a single CRM 214 or distributed across multiple computer readable media on multiple computing devices.

A user-interface (UI) module 216 generates one or more input forms for display at the computing device 202 in response to a data entry or video processing request. For example, a user (e.g., a researcher) of the SCORHE 10 uses an input device to interact with, for example, a web browser via a user interface to access and display a video processing request form or analysis result display generated by the SVPA 204. In one example, the user interface includes a display device, such as a computer monitor, for viewing data and/or forms and an input device, such as a keyboard or a pointing device (e.g., mouse, trackball, pen, touch pad, or other device), for allowing the user to interact with the video processing request form to generate a video processing request.

For example, a user enters data into the video processing request form to identify one or more recorded videos, home cages 20, mice, temporal data, or other data to identify video data to be processes. After data entry is completed, the user uses the UI to select one or more options displayed on the video processing request form to select which steps of video processing are to be performed, identify particular behaviors of interest, and/or input additional data to initiate video processing.

According to another example, the UI module 406 generates a results form for display via the display device of the computing device 202 or another computing device. The results form may include one or more graphs, charts, plots, or data in other formats to display the results of the video processing and a behavior identification and analysis.

In one aspect, the segmentation module 218 identifies objects in each video output from the cameras 122A-B of the SCORHE enclosure 100. For example, the segmentation module 218 partitions each frame of the video outputs into separate objects, based at least in part on the color, intensity, or texture of pixels in the image within each frame.

The classifier module 220 classifies the objects partitioned by the segmentation module 218 according to pre-defined characteristics or parameters. For example, the classifier module 220 classifies the position of the object(s) identified as the mouse according to pre-defined designations. These designations may include, but are not limited to: a) completely off the cage floor; b) on its hind-legs; or c) completely on the cage floor. In one aspect, the classifier module 220 assigns a designation to the object in each frame, by comparing the objects position and orientation to training data having manually assigned designations. By way of example, the training data may include over approximately 120,000 frames of video acquired from the SCORHE cameras 122A-B, with each image manually designated as one of the possible designations. In one aspect, the training includes designations for a variety of basic object shapes or blobs based on the shape data, such as the centroid, area and the major and minor axis end points for elliptical shapes.

The coordinate module 222 determines the physical coordinates of the objects identified by the segmentation module 218 in each frame. For objects in motion, the coordinate module 222 may use temporal data to determine the distance travelled by the object (i.e. mouse) as well as the speed of the object.

The occlusion reasoning module 224 determines whether an object identified by the segmentation module 218 is actually formed by the occlusion of one object by another. For example, when there are a pair of mice in close proximity to one another, the segmentation module 218 may identify the pair of mice as a single object or a blob. In response, the occlusion reasoning module 224 attempts to resolve this connected component, by separating the object or blob into two distinct objects. In one aspect, the occlusion reasoning module 222 considers the size and orientation of the blob, as well as comparing the individual frames from the video outputs from both cameras 122A-B to differentiate between the objects.

Validation System

Figure 11:
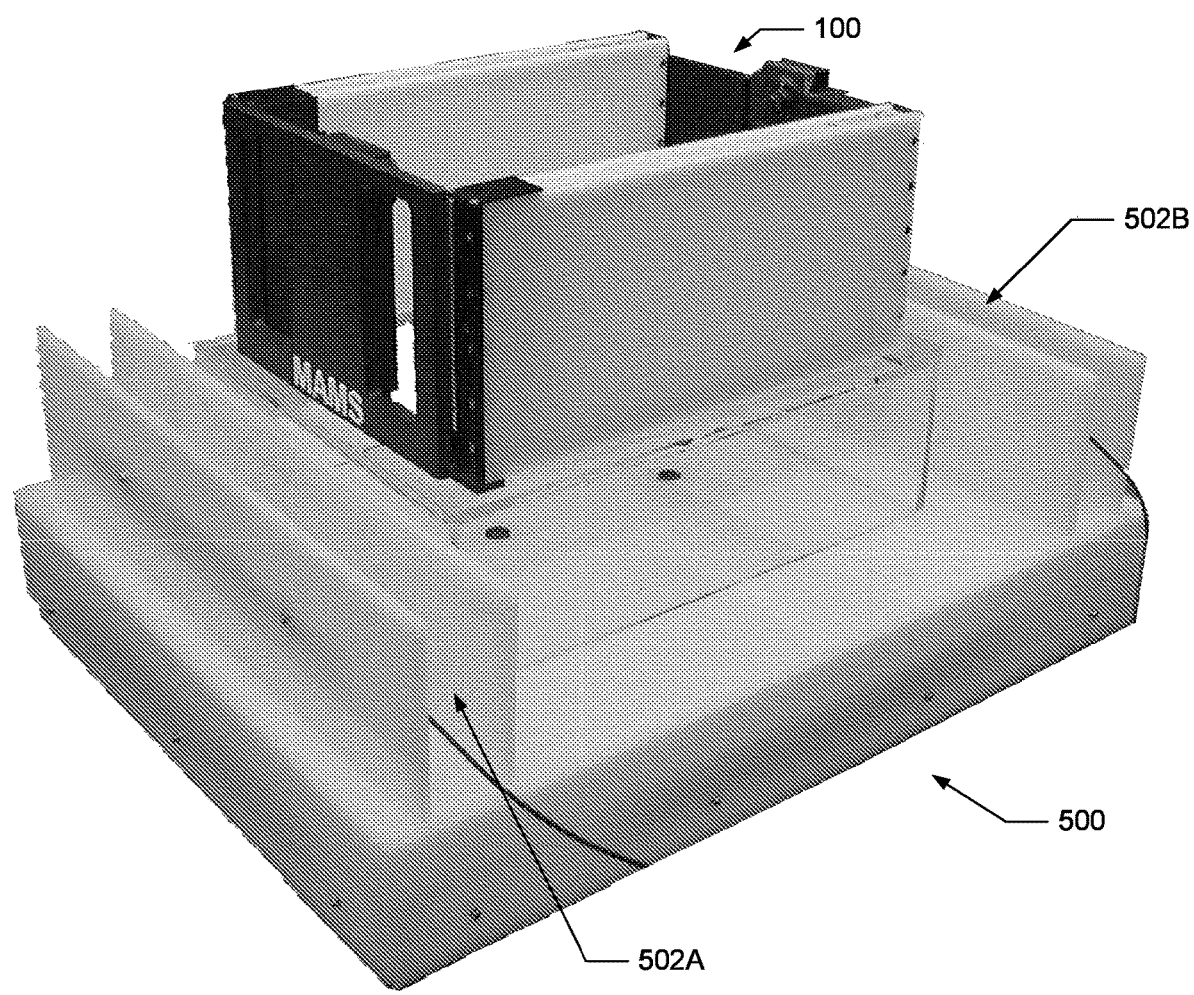
FIG. 11 is a photograph of a testing apparatus for validating the video-based monitoring system according to one embodiment.

In one embodiment, a secondary hardware system and corresponding algorithms were developed to quantify the accuracy of the SCORHE video processing algorithms and methods. To address challenges in determining the mouse coordinates, such as ambiguities due to self-occlusion (i.e. when the posture of the mouse renders parts of the same mouse unobservable in video) and the non-linearity of the video image due to the fisheye lens 124A-B, and to estimation of the mouse physical coordinates, a custom validation system 500, as shown in FIG. 11 was designed and constructed. Operating simultaneously and without interfering with the SCORHE enclosure 100, the validation system 500 provides a view into the cage that more readily yields physical coordinates (along the width and length of the cage 20, but not the height) of the mouse. The translucent acrylic construction holds NIR illumination assemblies 502A-B similar to the NIR illumination panels 142 and two cameras similar to the cameras 122A-B fitted with standard lenses.

During validation, the SCORHE enclosure 100 is placed on top of the validation system 500 at a height such that the whole cage floor is imaged by the dual-camera combined field-of-view. The home cage 20 includes a grid on the cage floor in place of the bedding. The additional NIR illumination included with the validation system 500 compensates for the absence of the higher-intensity surface (e.g., bedding) and enhances the contrast between the mouse and the cage floor.

As the dual-camera system capture the mouse movement, the validation system 500 simultaneously captures separate video that can be easily translated to precise physical coordinates. Although estimates of 3D coordinates within the cage volume are possible, for simplicity and ease of development, the methods herein described are limited to estimating position along the width and length of the cage. Estimates are restricted to when the mouse underside lies in one of two planes: the cage floor and the cage ceiling. To enable image- to physical-coordinate mapping in each of these planes, a calibration step is carried out in which a set of image points with known physical coordinates are marked. A linear fit relating the two sets of coordinates is then computed. The linear fit equation is an interpolation that enables computation of the physical coordinates of any image point. Armed with the mapping equation, a simple three-step algorithm was written to extract the physical coordinates of the mouse appearing in the validation station video. First, an image of the whole cage floor is constructed by means of tiling the two video feeds from the validation system cameras. Second, the resulting tiled image is segmented to localize the mouse blob. Third, mouse blob centroid coordinates are input to the fit function resulting in the corresponding physical coordinate for the center of the mouse along the width and length of the cage floor.

Figures 12, 13:
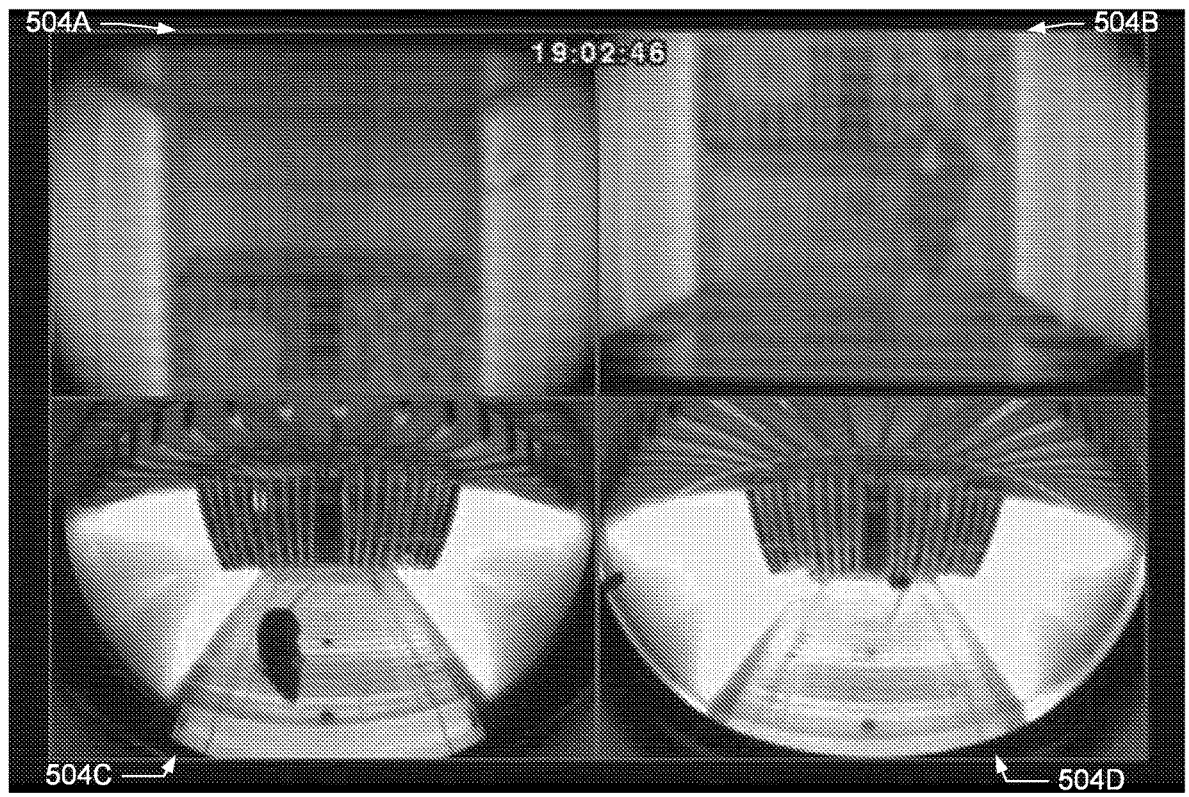
FIG. 12 depicts screenshots of video recorded during validation of the video-based monitoring system according to one embodiment.
FIG. 13 is a matrix of mouse behavior detection accuracy according to one embodiment.

FIG. 12 is a screen capture of video acquired with the SCORHE enclosure 100 mounted above the validation system 500. The top frames 504A-B are the validation system views, and the bottom frames 504C-D are the SCORHE views. The top frames 504A-B are aligned and segmented to determine the precise physical coordinates of the mouse within the cage.

Instead of using the same validation setup to gather on-ceiling mouse position data, the validation system 500 was placed in an inverted orientation on top of the cage, and the normal cage lid was removed to render the cage visible to the validation system cameras. The primary reason for using the top-down view of the cage was to avoid the negative effects on mouse behavior in the absence of cage bedding. A lack of bedding resulted in the mouse never hanging from the ceiling.

Validation

To evaluate accuracy of the distance travelled measure, two independent recordings of SCORHE coupled with validation system video were acquired. The distance travelled by the mouse as computed from the validation system video is regarded as the actual distance. This true distance is compared to the distance estimate obtained by processing the SCORHE video. The ratio of the estimated distance and the actual distance is taken to be the SCORHE accuracy ratio. The first recording, a 60,000 frame sequence, was used to establish an accuracy rate for the on-floor distance estimation method. The mouse was on the floor for approximately 19,000 frames spread throughout the sequence, and on its hind legs for the remaining number of frames. The SCORHE on-floor distance measure accuracy ratio was 97%. The second recording, a 2,900 frame sequence, was used to establish an accuracy rate for the on-ceiling distance estimation method. The mouse was on the ceiling of the cage for the whole duration of the sequence. A comparison of estimated and true distance traveled for the 2,900 frame sequence resulted in an SCORHE on-ceiling distance measure accuracy ratio of 90%.

The accuracy of the mouse placement classifier was determined by comparing the classifier output with manual scoring for 88,811 frames. The three different behaviors were represented almost evenly in the chosen video clips. FIG. 13 is a confusion matrix 600 for SCORHE single-mouse processing. The matrix 600 is based on the classifier output for approximately 90,000 manually scored frames.

Video Processing Algorithms and Outputs

The video processing system 200 of the SCORHE 10 is a useful behavior analysis tool that is well suited for the automated processing of the two video outputs from the dual-camera system 120. In many aspects, the video outputs are inherently different from that of other monitoring systems due, at least in part, to the camera positioning and perspective, as well as the use of the fisheye-lenses 124A-B. These features may preclude or limit the use of other academically or commercially available video analysis software applications to process the SCORHE video outputs. Therefore, in some embodiments, the SCORHE uses specially developed methods and algorithms for accurately and automatically processing the video data captured by the dual-camera system 120. In one aspect, efforts were made to keep the methods and algorithms employed simple, when there is no need to ascertain an upper limit on the accuracy of the system or to determine a number of measurable behaviors. In other aspects, more elaborate methods and algorithms were developed to enhance the accuracy of analysis and increase the level of detail (e.g., measurement variety and subtle behavior discrimination).

Figure 14:
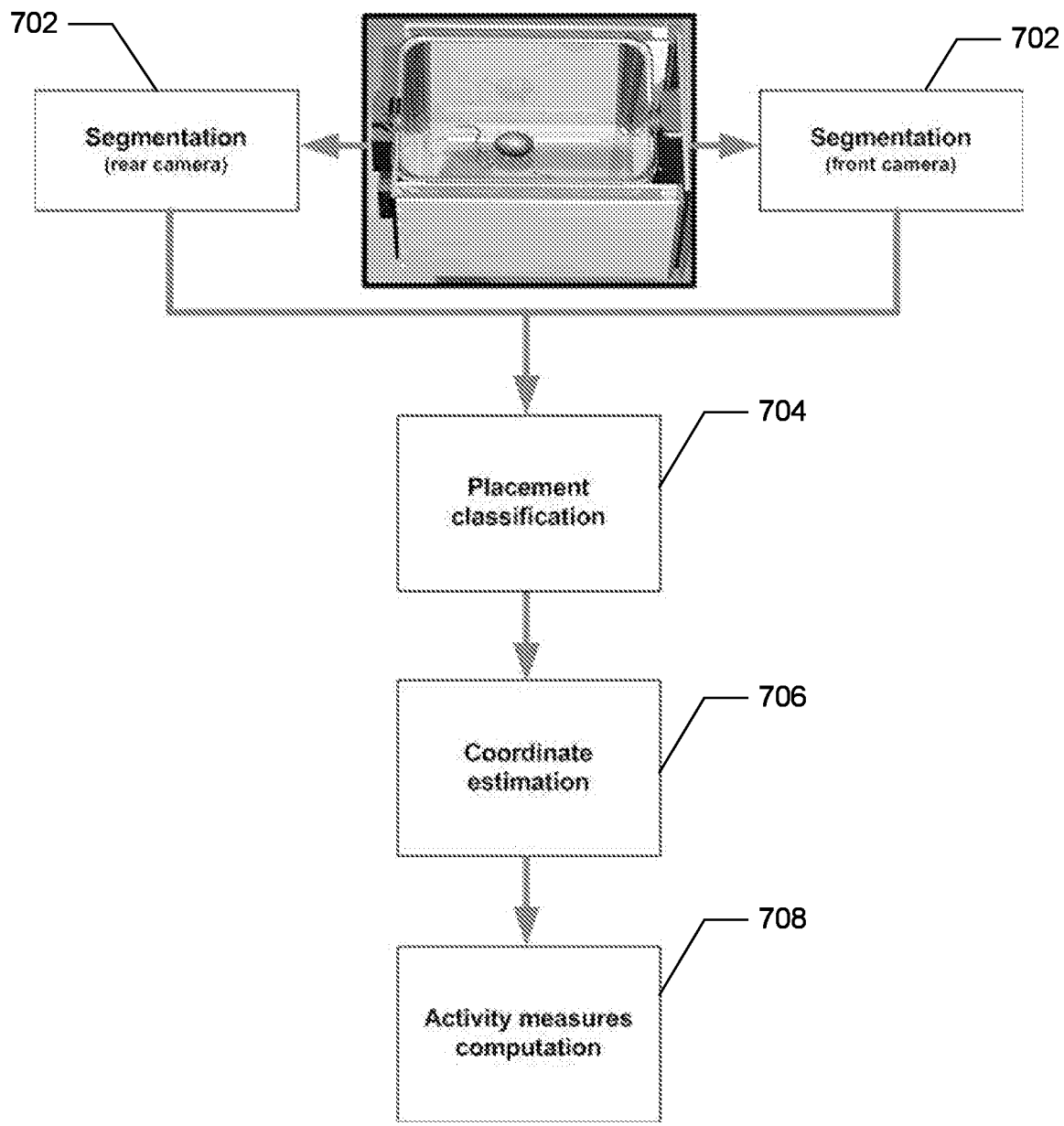
FIG. 14 is a flow chart depicting a method of video processing according to one embodiment.

FIG. 14 is a flowchart depicting one embodiment of a method 700 or algorithm to measure the distance travelled by the mouse, as well as to report the time durations of the mouse being on-floor, off-floor, and on-hind legs (i.e. in a rearing posture) for use with singly-housed mice. In one embodiment, the SCORHE output video is saved to a hard-disk and the algorithms were subsequently executed.

To demonstrate the viability of extracting mouse activity measure from the SCORHE video in one embodiment, the methods and software algorithms were developed to calculate the distance travelled by the mouse, as well as the time spent by the mouse in various positions relative to the cage floor 26 (e.g., completely off the cage floor; in an elevated bipedal stance; and on the cage floor). More specifically, for each frame of video a label is generated indicating whether all four limbs are on the cage-floor, only the hind legs are on the cage-floor, or all four limbs are off the cage-floor. In one example, the SCORHE was used to study the quantitative difference in the activity levels between a C57BL6 ABCB5 knockout mouse and a parental C57BL6 mouse that were housed singly.

In one aspect, the processing algorithm for singly-housed mouse is based on the fusion of information derived from both cameras. In one aspect the, video outputs are received at the segmentation module 218 of the SCORHE application 204. As explained more fully below, the video data is segmented at 702 and outputs of the segmentation module for each video output are combined. At 704, the classifier module 220 classifies the mouse placement as either completely off the cage floor, on its hind-legs, or completely on the cage floor. The output of the classifier module, which in one aspect is a coarse measure of activity itself, is then used to estimate the physical coordinates of the mouse within the cage 20 at 706. The coordinate module 222 determines the physical coordinates of the mouse in each frame. In addition, at 708, the coordinate module 222 uses temporal data to measure the distance travelled by the mouse and optionally, to estimate the speed of the mouse during movement, among other activities and behaviors.

Segmentation

At the segmentation module 218, the SCORHE application 204 identifies pixels in the video outputs that correspond to mouse. Due to the combined effects of the NIR illumination system 140, the visible light blocking filter and each camera's spectral sensitivity range, the video outputs are typically monochromatic. In one example, the SCORHE 10, is used to monitor mice having dark (e.g., black) coats. The dark-colored mouse is therefore of lower intensity than the background. In this example, a single image-wide threshold, however, is not relied on to isolate mouse pixels, which may be identified as a foreground object from the background. Instead, the image is divided into localized regions with similar contrast and intensity properties. For example, the cage ceiling or lid, bedding, the illumination panels, and the feeding-hopper areas may be considered as localized regions. Robust threshold levels are chosen for each region. In one embodiment, the output from the segmentation module 218 is a binary image with white pixels where the intensity level is lower than then corresponding regional threshold value. Therefore, the darker pixels are identified as potentially corresponding to mouse.

Next, a connected component analysis (i.e., blob analysis) is performed on the threshold binary image to identify groups of contiguous pixels (i.e., blobs). Blobs deemed too small to physically represent a mouse are eliminated. For each of the two camera images, the physically largest remaining blob is then identified as the mouse. Blob statistics, such as centroid and ellipse fit parameters, are also determined for each blob.

Placement Determination

The classifier module 220, that has been trained using a feature set, as previously described, is used to determine whether the mouse is completely on the floor, totally off the floor (i.e., on the wire-bar lid), or in a rearing posture with only hind legs on the floor. In some embodiments, behaviors such as scratching or grooming are classified as to the mouse being located on the floor. In one aspect, if the mouse is in the field-of-view of both cameras 122A-B, the blob data, as determined at the classifier module 220, from both views (i.e., front and rear) are fused, and a placement determination is made based on the concatenated features set.

To ensure that of all the features evaluated by the classifier module 220 are equally weighted, each feature is normalized by a corresponding standard deviation. The final mouse classification is then determined with a nearest neighbor classifier, in one embodiment. The nearest neighbor method does not require any statistical or probabilistic assumption, but rather assigns a new data point to the same class as the nearest point in the training feature set. In particular, the Euclidean distance is used to determine nearness for the nearest neighbor method.

Coordinate Estimation

The coordinate module determines the position of the mouse within the cage 20 and determines the distance travelled by the mouse. As, the dual-camera system 120 does not provide multiple (e.g. orthogonal) views of the whole cage space, traditional rigorous mathematical models for recovering physical coordinates from output images is not preferred, although they may still be used.

To derive the mouse-position estimation function, a time synchronized learning set composed of known physical coordinates (i.e., obtained from the video processing validation system as previously described) and their corresponding blob features are used. The learning set is obtained by processing validation system and SCORHE enclosure 100 videos. For each set of video frames (i.e., two streaming from the cameras 122A-B, and two streaming from the validation system, as shown in FIG. 12), the previously described three step algorithm is applied to the validation system frames to generate the physical coordinates of the mouse, while the SCORHE enclosure video stream is processed normally to generate the blob features. As stated earlier, two mapping functions were utilized, one for the floor plane (i.e. when the mouse is on the floor), and another for the ceiling plane (i.e. when the mouse is hanging on the ceiling). For on-floor position estimation, a third degree polynomial fit well modeled the relation between blob centroid and the physical position. The fit was generated based on approximately 6,000 sets of coordinate pairs (i.e. the physical coordinates extracted from the validation station video, and the corresponding blob image centroid extracted from the SCORHE enclosure video). When the mouse is on the ceiling, the blob centroid was not sufficient to correlate image coordinates to physical coordinates, therefore all of the blob statistics were used to estimate the mouse position. The estimate is obtained through a weighted k-Nearest Neighbor method with k=20. The on-ceiling learning set is composed of approximately 5,000 measured coordinates paired with the corresponding set of SCORHE blob statistics. When a new frame in which the mouse is on the ceiling is captured by SCORHE, the extracted blob statistics are compared against the on-ceiling learning set. The Euclidean distance between the extracted set of blob statistics and each element of the learning set is computed. An average of the coordinates of the nearest twenty data points weighted by their inverse distance is taken to be the on-ceiling position estimate.

Activity Data Computation

The various methods and algorithms are used to produce data corresponding to the physical position of the mouse and a placement classification for each set of frames received from the dual-camera system 120 of the SCORHE enclosure 100. Further analysis to characterize the actual behavior of the mouse may be conducted using a wide variety of techniques, including those well-known to one having ordinary skill in the art. By way of example, an hourly plot of one or more measures over the entire circadian cycle may be used to study the mouse behavior. In this example, the SCORHE application is configured to generate data for one-hour increments over the complete circadian cycle. The time duration associated with each of the three placement classifier outputs (i.e., on-floor, off-floor, on-hind legs) may be determined as the fraction of frames assigned to each of the three categories over each increment. To compute the distance travelled each hour, the difference in the mouse position at two second intervals is computed using the Euclidean metric, and summed over the entire hour. In one embodiment, if the mouse is classified to be on its hind legs, then no physical coordinate estimate is generated. The contribution to distance measure in that case is taken to be the difference between the mouse position before standing on its hind legs and after returning to the floor or climbing fully on the ceiling.

Doubly-Housed Mice Video Analysis

In various embodiments, the SCORHE 10 can be used to monitor the behavior of doubly-housed mice. An experiment to display the efficacy of the doubly-housed mice video analysis algorithm was conducted to detect and quantify the altered activity levels resulting from administering a sedative. In particular, doubly-housed mice to study the activity levels of mice over-expressing HMGN1 and their normal control counterparts were monitored. In the experiment to quantify efficacy, one of the desired mouse monitoring measurements for this project development was the number of rearings, incremented every time part of the mouse blob crosses an estimated vertical threshold boundary. Other activity measures are the number of crossings along both the shorter dimension of the cage (i.e. side-to-side) as well as the longer dimension (i.e. front-to-rear and vice versa). The duration of time in which the mice remain motionless was also computed.

Figure 15:
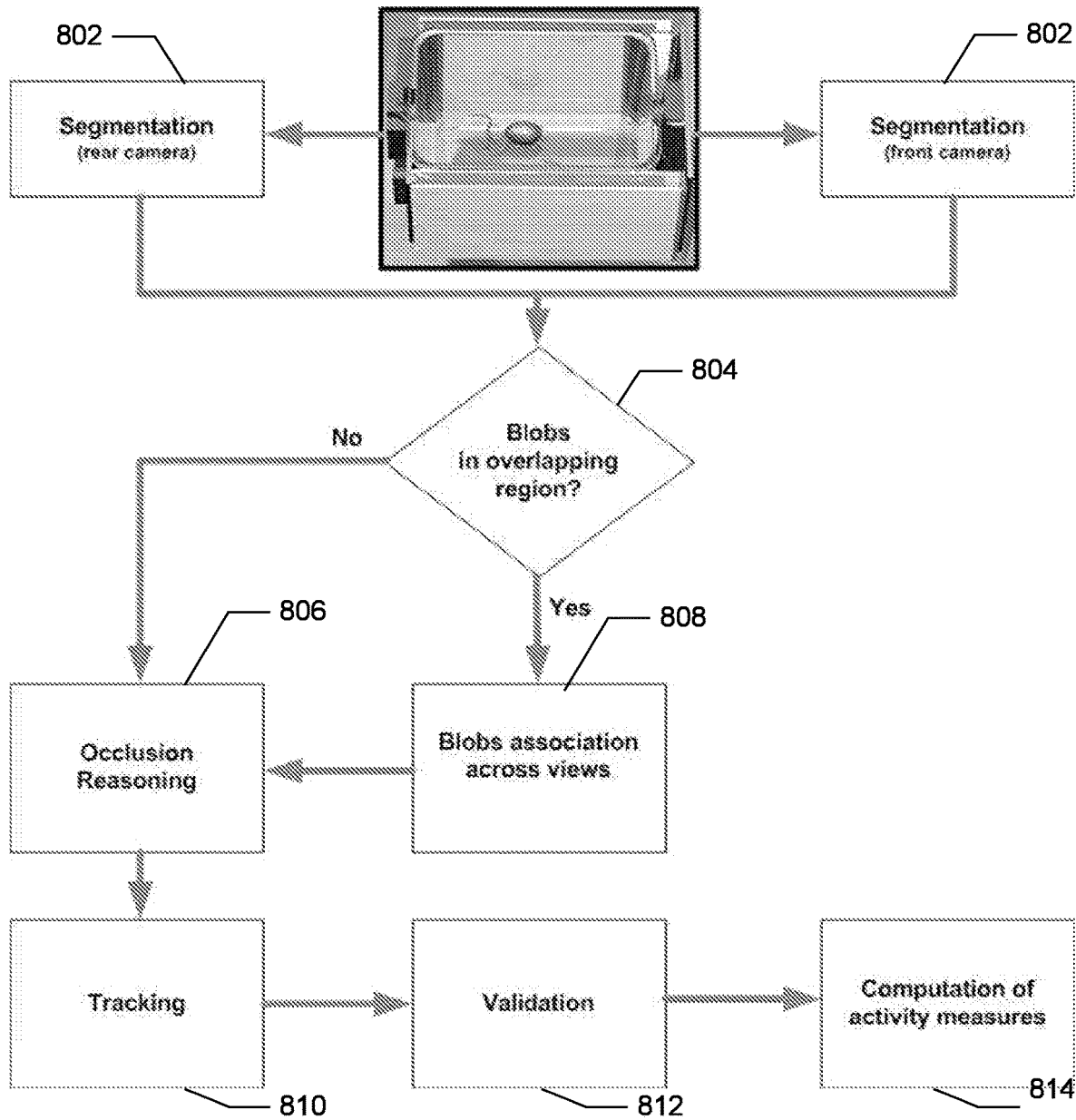
FIG. 15 is a flow chart depicting a method of video processing according to one embodiment.
Figure 16:
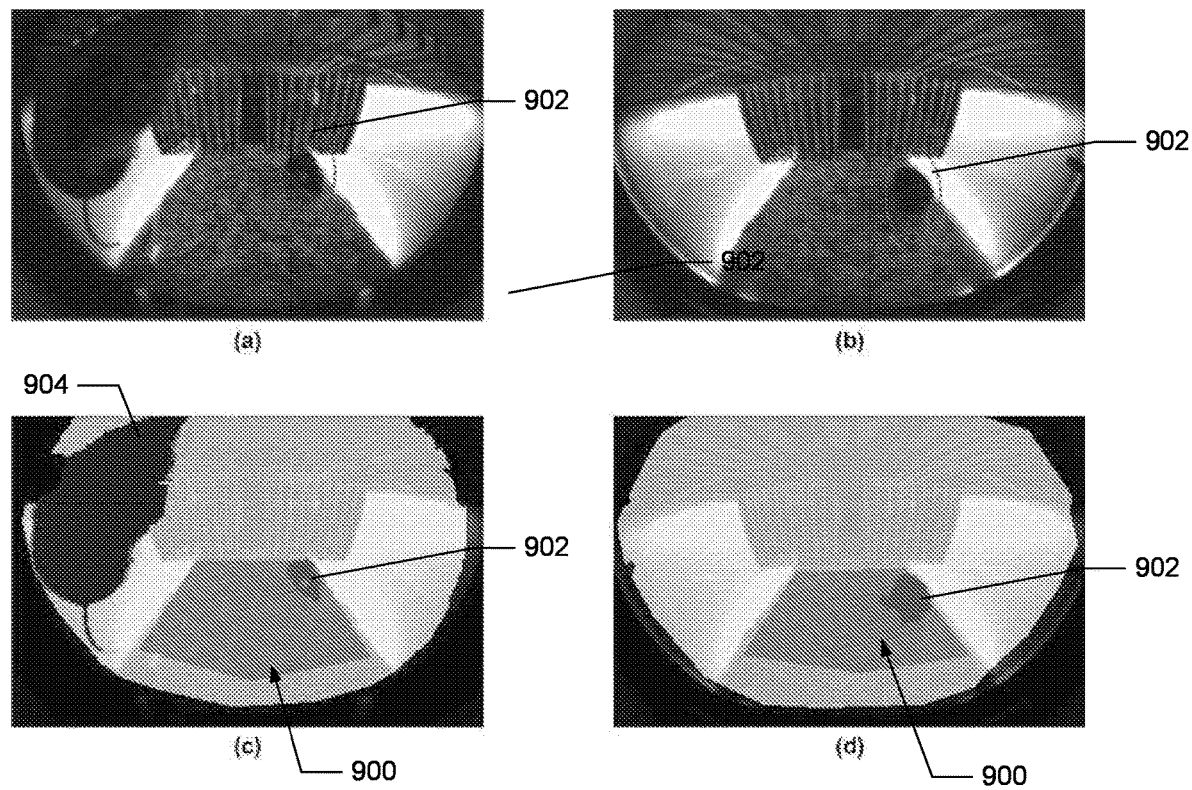
FIG. 16 depicts screenshots of recorded video during video processing according to one embodiment.

FIG. 15 is a block diagram depicting one embodiment of a method 800 or algorithm developed to process video from doubly-housed mice. At 802, the segmentation module segments the video from both cameras 122A-B, in the same manner as previously described for analyzing singly-housed mice. In this embodiment, however the resulting output typically includes up to two blobs per view. At 804, each blob is assigned one of two cage region designations depending on its location in the image. The region designations are an overlapping region or a non-overlapping region. As shown in FIG. 16, blobs appearing in the overlapping region 900 of the cage are matched and assumed to be due to the same mouse.

As shown in FIG. 15, the mouse 902 (in dashed ellipse) appearing in both (a)front and (b)rear SCORHE cameras results in two blobs each of which is in the overlapping region (highlighted) of their respective cameras (c) and (d), and thus accurately deemed as due to the same mouse (same identity indicated by color coding). The remaining blob 904 is due to the mouse appearing in the non-overlapping region.

Figure 17:
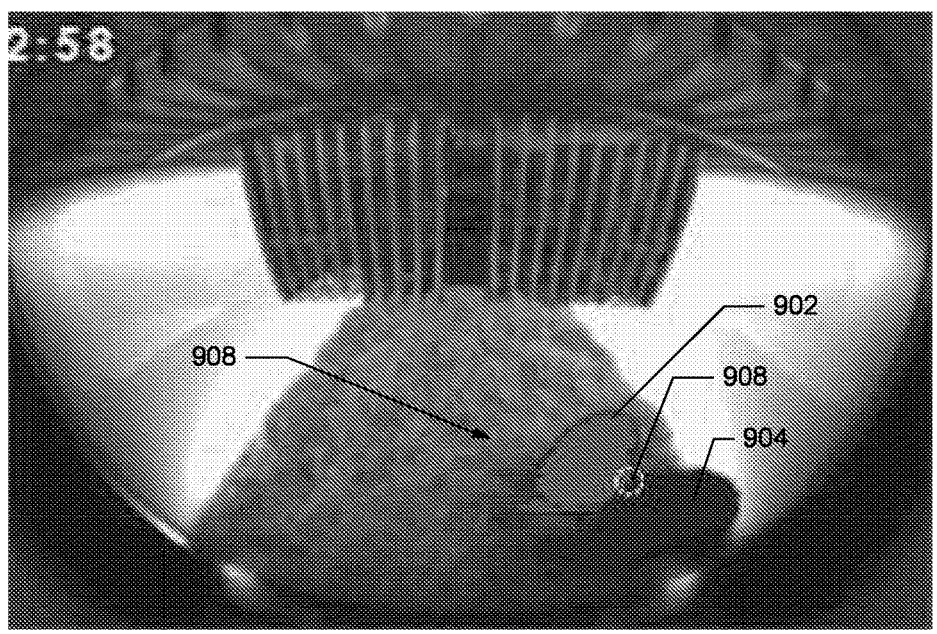
FIG. 17 is a screenshot of recorded video during video processing according to one embodiment.

The total count of blobs in both views, as well as their respective region designation, are processed at 806 and 808 using a set of rules to detect occlusions, where a single blob encompasses two mice. For example, if a blob 906, as shown in FIG. 17, is determined to be due to two occluding mice, the severity of the occlusion is assessed by searching for corner points in the blob, identified as significant inward dents in the blob contour. If no corner point is found, the occlusion is deemed severe and irresolvable. If, on the other hand, a corner point is found that qualifies as an occlusion junction 908, as shown in FIG. 17, the blob 906 is split along a line passing through the corner point and parallel to the radial line of a circle centered at the centroid of the blob. All pixels on one side of the line are considered to belong to one mouse 902, while pixels on the other side of the line are considered to belong to the other mouse 904. If each of the two mice are represented by a separate blob, the minimum Euclidean distance between blob centroids in successive frames is used to assign an identity to the mouse. If, however, the mice are represented by a single blob that cannot be resolved into two blobs, the mice identities are lost.

The occlusion reasoning module 224 determines that the sole blob 906 detected by the segmentation module 218 as two occluding mice 902 and 904. The dotted circle indicates the corner point regarded as the occlusion junction 908. In one aspect, the occlusion reasoning module 224 separates the pixels along the line parallel to the radial line of a circle having the same center as the occluded blob and passing through the corner point.

In one aspect, the doubly-housed mice SCORHE method 800 incorporates a consistency check on the segmentation results. In particular, If the number of detected blobs in a single view exceeds the number of mice known to be housed in the in the cage, an error is noted. Similarly, the error is also noted if the total number of blobs across both frames and images, that have been designated as appearing in a non-overlapping region exceeds the actual number of mice present in the cage. In one embodiment, frames that are associated with an error are reanalyzed, in another embodiment, when an error is noted in both frames (i.e. front and rear cameras) are simply discarded, and are not used in the subsequent extraction of any mouse activity measures.

Figure 18:
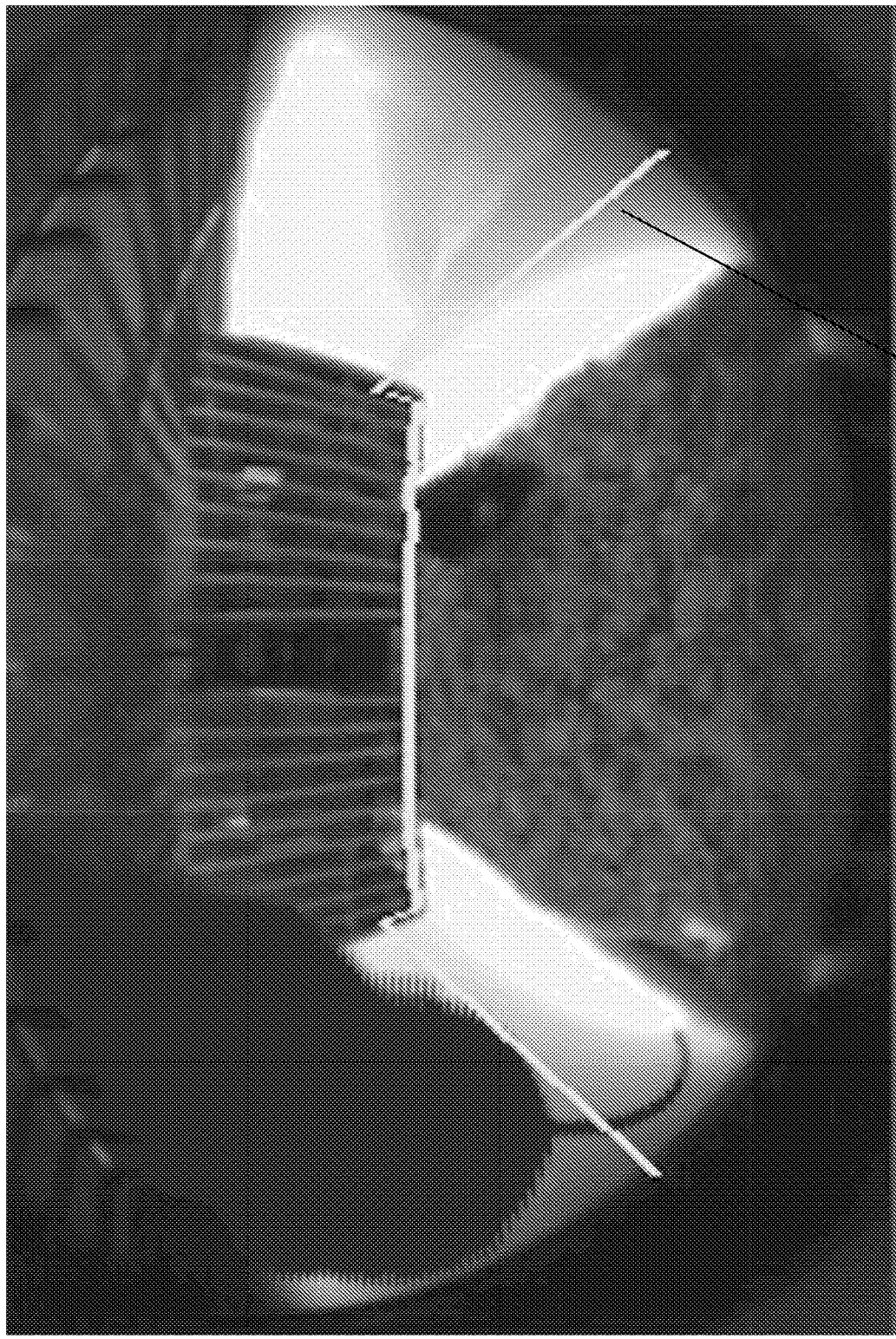
FIG. 18 is a screenshot of recorded video during video processing according to one embodiment.

The determination of mouse activity measures occurs at blocks 810-814. For example, a count of the number of mouse rearings is incremented when any part of the blob crosses a preset vertical threshold boundary 910, as shown in FIG. 18. The vertical crossings (i.e. rearings) threshold line 910 is superimposed on the image for illustrative purposes. The threshold boundary was empirically set such that a mouse fully rearing or hanging on the ceiling would result in the corresponding blob crossing the boundary. A blob encompassing two occluding mice, regardless of whether or not the occlusion was resolvable, contributes a single rearing count if any part of it exceeds the boundary. This approach avoids any over-estimation in the rearings count.

Similarly, a front-to-rear crossings count is incremented when a mouse leaves the front region of the cage 20 and enters the rear region, and vice versa. In various embodiments, the front and rear regions and, respectively, are defined by user-defined boundaries (e.g., approximately 3 inches from the nearest cage wall), and are separated by a buffer zone identified a hysteresis region. Mouse motion that does not completely cross the buffer zone does not contribute to the total front-to-rear crossings count. Contrary to the rearings measure, the front-to-rear crossings count is doubly incremented if an inseparably occluded blob moves from one region to the other, since the blob motion is due to the displacement of both mice.

A side-to-side crossings count is incremented in a similar fashion to the front-to-back crossings count when the blob crosses from the left to right side of the cage, and vice versa. Here also, the regions are separated by a similar buffer zone, and both mice are accounted for (i.e., double count) in the case of a single occluded blob crossing.

An inactivity measure is the duration of time the mouse was motionless. The perimeter of the mouse blob is compared every two seconds. If the number of perimeter pixels that have changed position is within an empirically set tolerance, the mouse is considered inactive for two seconds. An inactive single blob (i.e. deemed as two occluding mice) is regarded as both mice being inactive.

Additional Experimental Tests and Results

The following is a description of other studies performed using the SCORHE 10. In particular, three studies, one for singly-housed mice and two studies for doubly-housed mice were carried out using two SCORHE enclosures 100. For all the studies, the animal facility daily light cycle was twelve hours of darkness followed by twelve hours of light. All studies conformed to the guidelines of the National Institutes of Health (NIH) Animal Care and Use Committee (ACUC).

The first study was to compare the mouse activity profiles of singly-housed ABCB5 knockout (KO) strain and the C57BL/6J wild type (WT) strain. Four months old mice, five male and five female, of each strain were used. A home-cage with the WT strain was placed in one of the SCORHE enclosure 100s while the cage housing the KO strain was placed in the other, both at the start of a dark cycle. Both strains were allowed 24 hours for acclimation, and subsequently recorded for two full diurnal cycles. The SCORHE video recordings were later processed to generate the four activity measures discussed in the algorithm description section.

Figure 19:
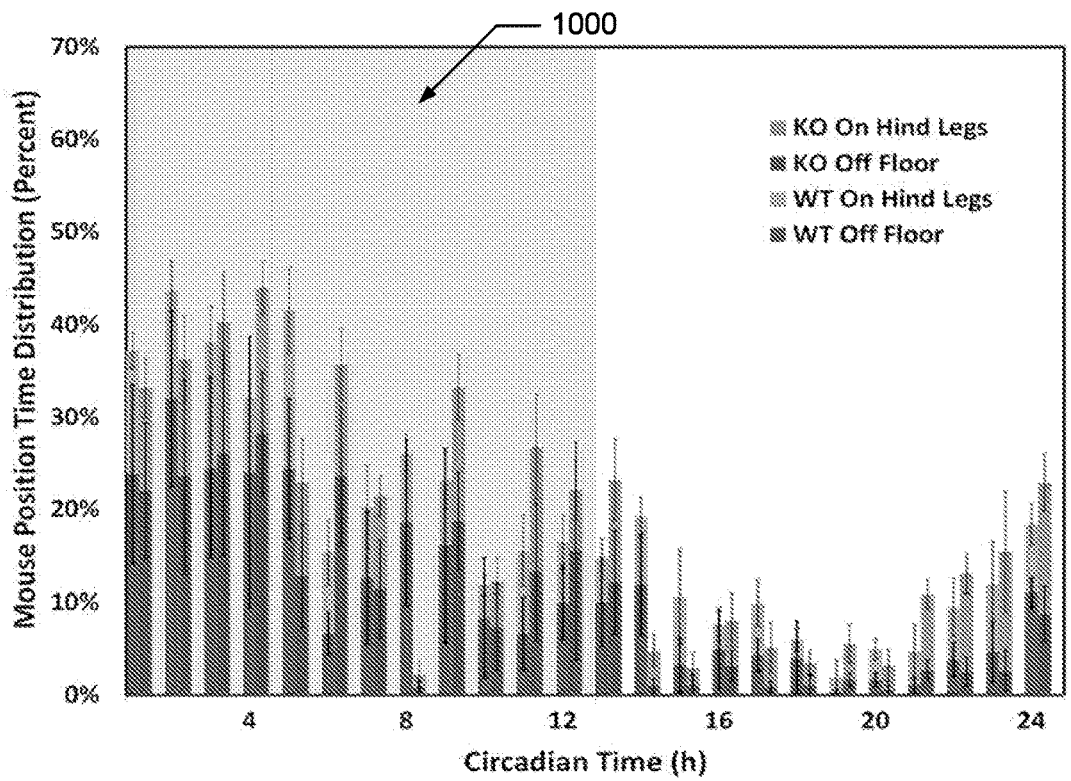
FIGS. 19-22 are charts of mouse activity detected by the video-based monitoring system according to one embodiment.
Figure 19:
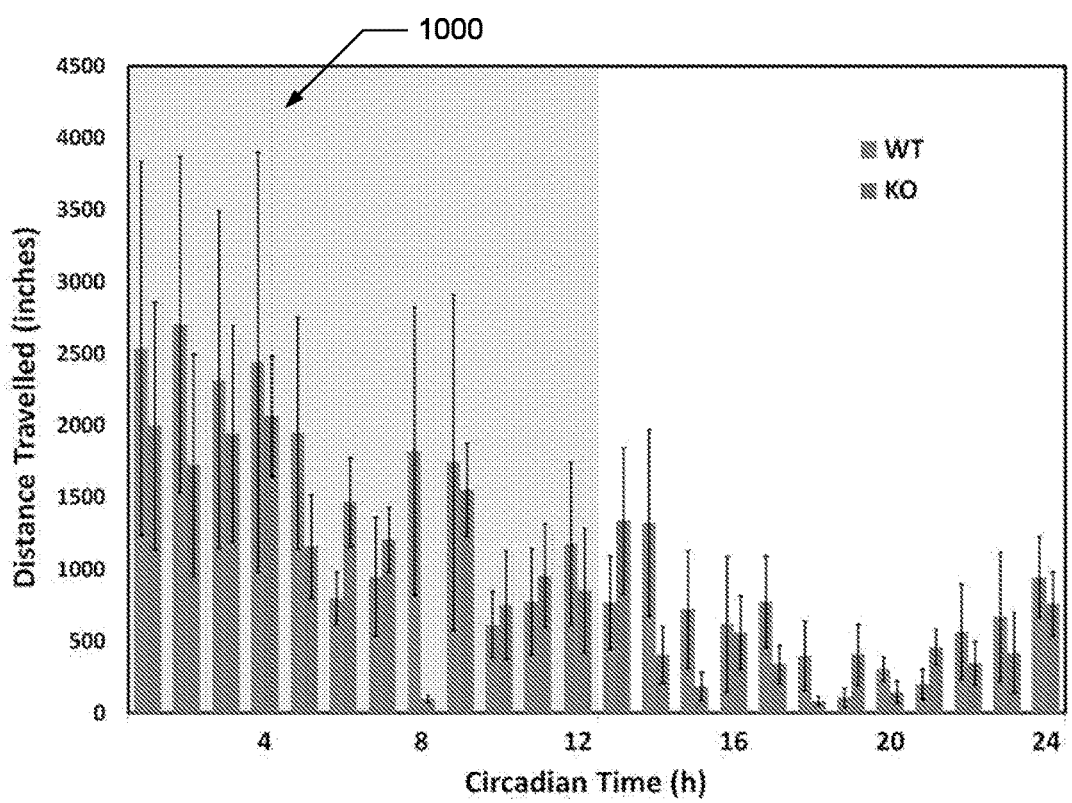

FIGS. 19A-B depict the mouse activity profiles comparison for five sets of singly-housed wild type C57BL/6J strain and ABCB5 knockout strain. The starting time for both plots is the dark cycle as indicated by the gray shading. Two of the three output mouse placement measures of the single mouse processing algorithm (i.e. on-floor, on-hind legs, off-floor) are shown for female KO and WT mice in FIG. 19A a). To compactly display the mouse placement proportions for both strains (i.e. KO and WT), each bar is formed by stacking the five-day averaged off-floor and on-hind leg placement percentages. The remainder of each hour (i.e. completing each bar to a full height of 100 percent), although not explicitly shown in the graph, logically corresponds to mouse on-floor placement. The mouse distance travelled measure in inches per hour is shown in FIG. 19B. The starting time for both plots is the dark cycle as indicated by the gray shading 1000. The overall results, taking into account the five day variability shown by the standard deviation bars, do not show a clear distinction in activity profiles between the two strains. The similarity between the activity profiles of the two strains is useful information in comparing the behavior of these parental and knock-out C57BL6J mice.

Figure 20:
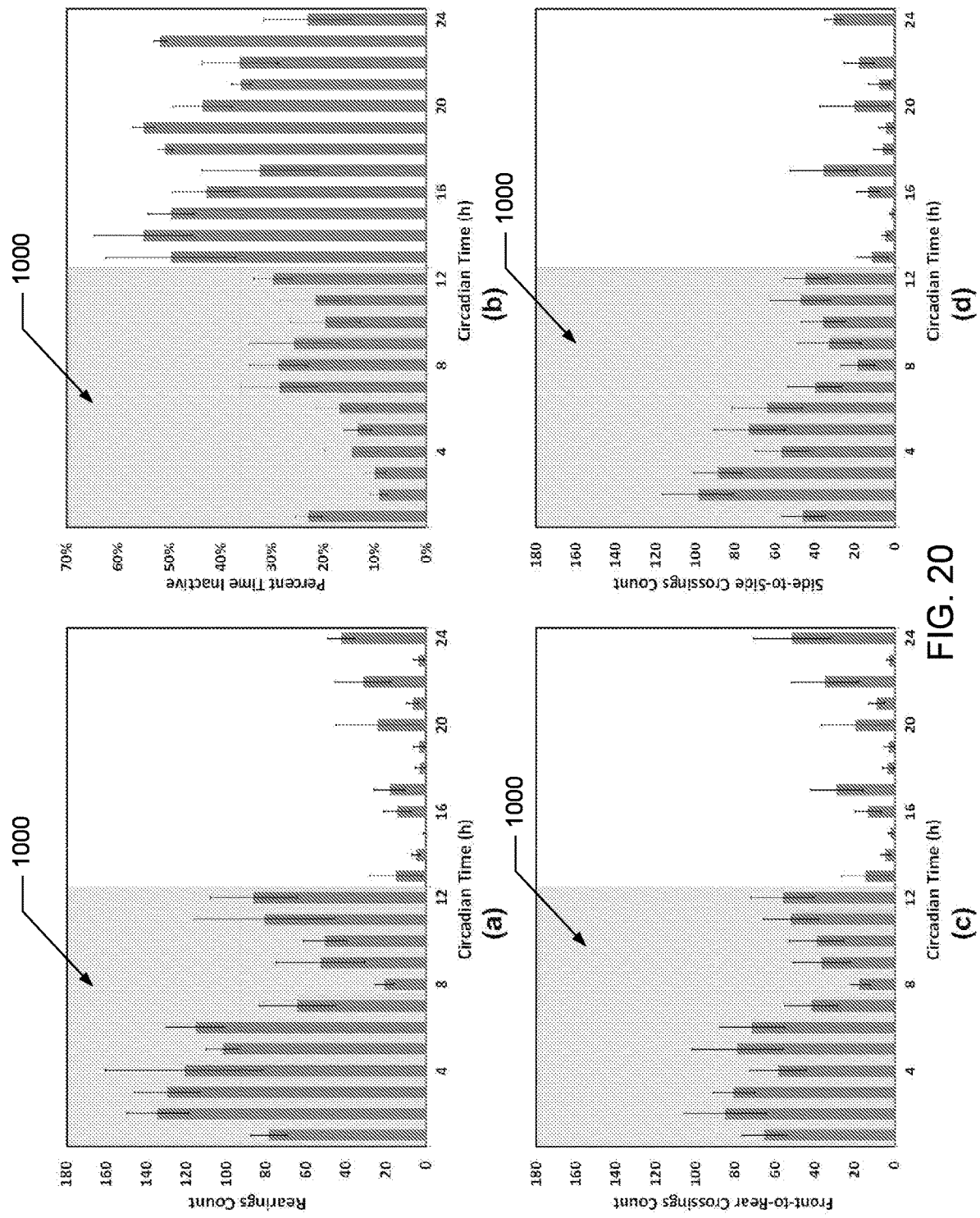

The second study was designed to demonstrate the utility of SCORHE in detecting deviation from a baseline activity profile for doubly-housed mice. Two mice (C57BL/J6 wild type strain) housed in a single cage were placed in a SCORHE enclosure 100, and recorded for three consecutive diurnal cycles. The baseline recordings were processed to generate a 3-day average of four activity measures: rearings count, inactivity duration, front-to-back crossings, and side-to-side crossings, as shown in FIG. 20. As shown, the SCORHE 10 was used to identify and measure four behaviors: (a) rearing counts, (b) percentage of time inactive, (c) front-to-rear crossings count, and (d) side-to-side crossings count. The gray shading 1000 in the plots indicates the dark cycle.

Figure 21:
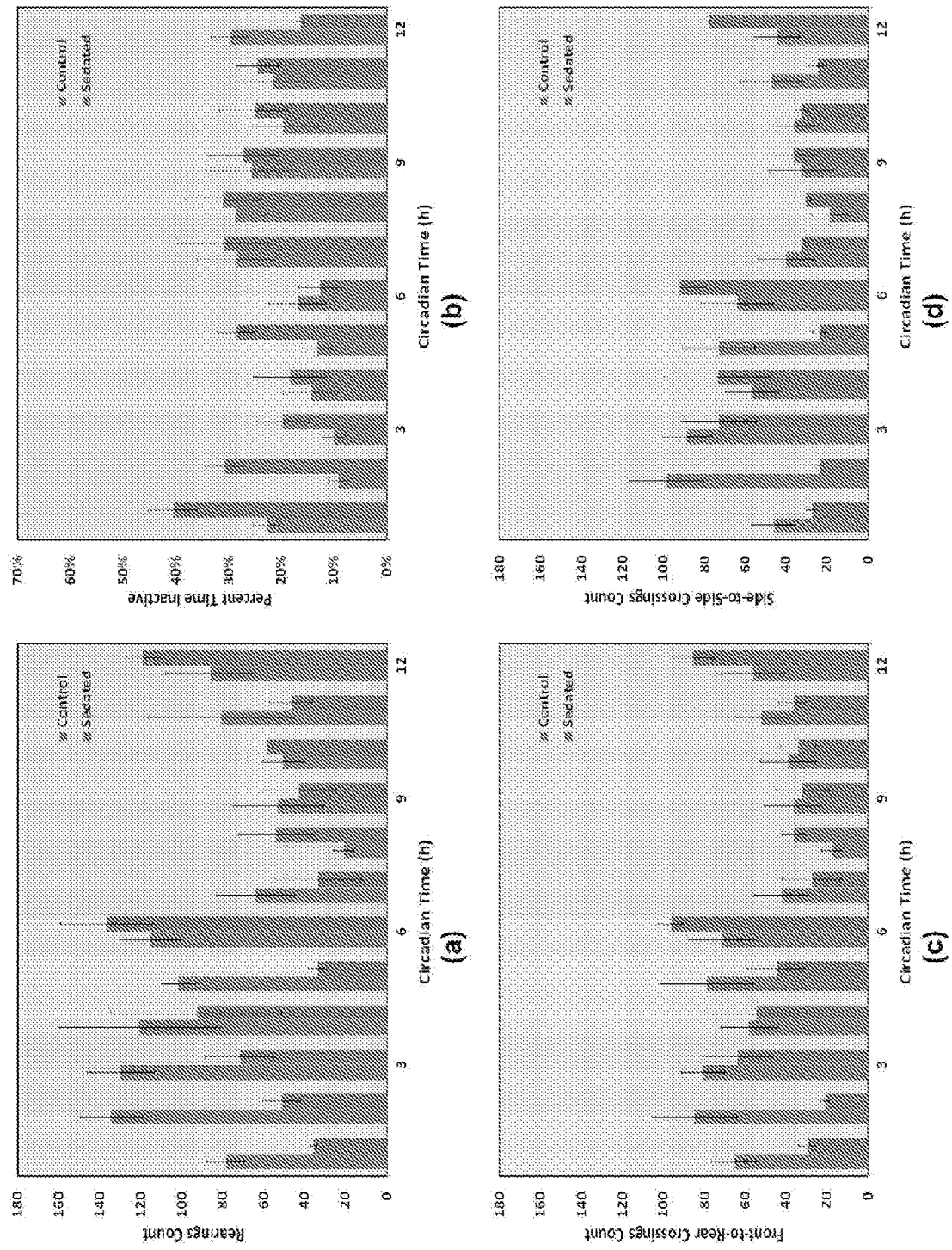

Subsequently, in order to induce a pronounced effect on activity, the same mice were subjected to a sedative (0.667 mg/Kg dose of acepromazine) at the beginning of the dark cycle, the time at which the mice normally exhibit high activity levels. For the three days following the baseline acquisition, the same sedative dose was administered to both mice in the cage at the onset of the dark cycle, and a SCORHE recording was started. The SCORHE video of the sedated mice was acquired only for the dark cycle, a duration sufficient to encompass the temporal difference in activity levels due to the sedation. The video was processed to extract the same measures as those of the baseline. The decreased activity in the sedated mice is evident for the first five hours of the dark cycle. FIG. 21 displays various behaviors after the administration of a 0.667 mg/Kg dose of acepromazine (a tranquilizer) on wild type C57BL/6J strain mice. In particular, FIG. 21 depicts four behaviors: (a) rearings count (b) percent time inactive (c) front-to-rear crossings and (d) side-to-side crossings. The sedative effect is evident for five hours after the injection.

Figure 22:
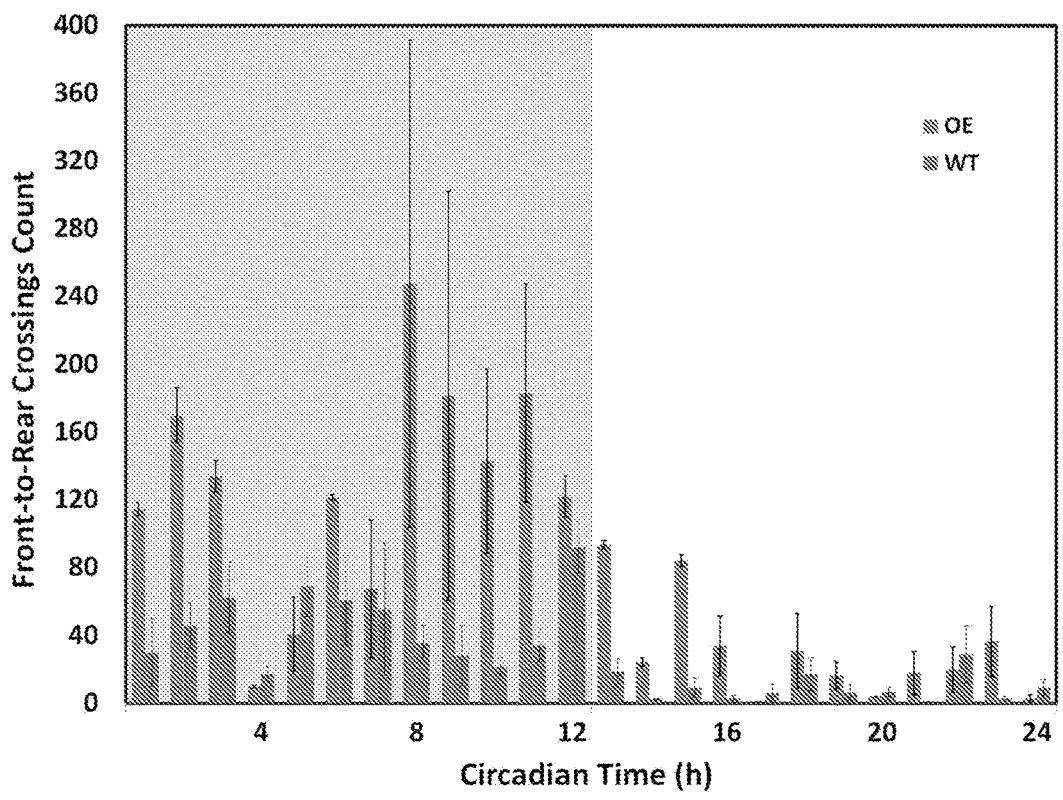
Figure 22:
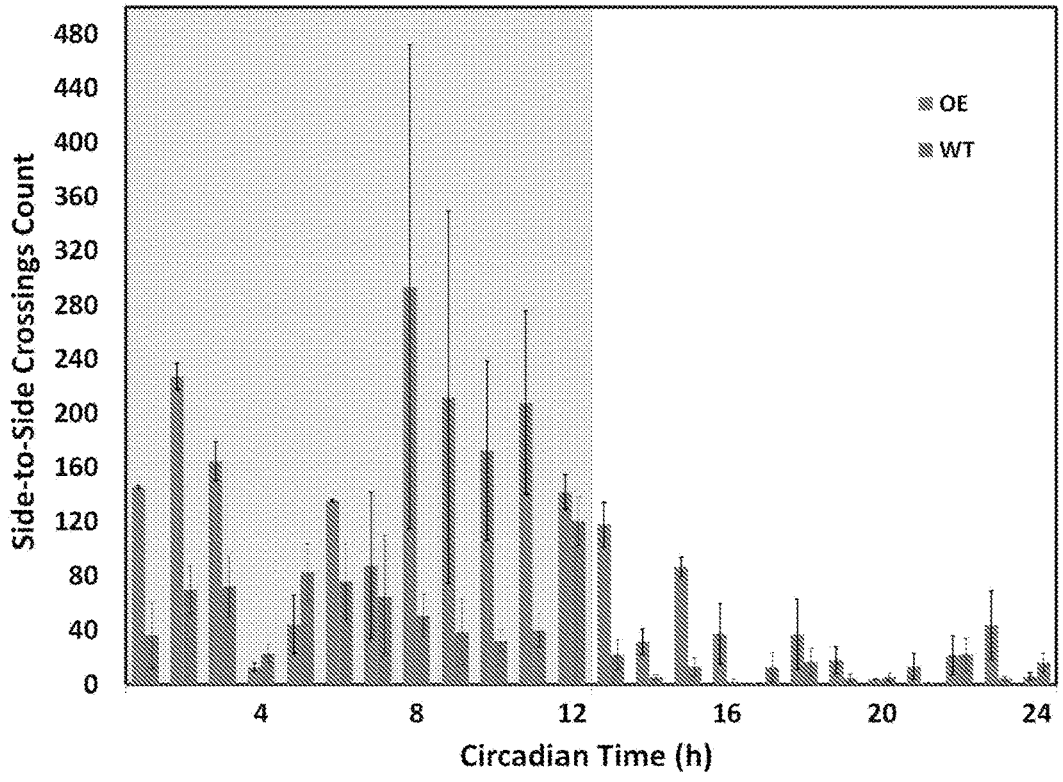

The subjects of the third study were HMGN1 over-expresser mice and their wild-type counterparts. For each strain, a cage housing two mice was placed in a SCORHE enclosure 100 for two full 24 hour cycles. The acquired video was processed to obtain the side-to-side and front-to-back crossings counts. FIG. 22 depicts the two-day averages for the behaviors of (a) Front-to-back crossings, and (b) Side-to-side crossings in doubly-housed HMGN1 over-expresser mice (OE) and C57BL/6J wild-type strain mice (WT).

In various other embodiments, the development of more advanced SCORHE processing algorithms will help mitigate the effects of video blind-spots. For example, the time spent in the blind-spots could be accounted for by reliably detecting entry into and exit from the blind-spots.

Extending SCORHE NIR illumination with corresponding grayscale (i.e., visible spectrum blocked) video acquisition through the daytime hours allows use of the same SCORHE video processing algorithm over the complete diurnal cycle. Use of the same algorithm ensures seamless video processing across lighting transitions in the animal facility, which enables robust comparison between night- and day-time activity levels The SCORHE enclosures 100 installed in National Cancer Institute vivariums endured prolonged use and required no routine maintenance. Other than opening and closing the door of the SCORHE enclosure 100 while placing the cage in the rack slot, the SCORHE enclosure 100 does not alter animal facility procedures.

The Matlab code operates on a single video file in which the front and rear camera feeds are tiled. For the singly-housed mouse SCORHE algorithm, the video processing (i.e. segmentation, position classification, and coordinates estimation) rate is approximately 23 frames per second. The processing algorithm for the doubly-housed mice configuration produced the mouse activity measures at approximately the same rate as that of the singly-housed mouse. Achieving these processing frame rates demonstrates the potential for migration to real-time video processing (i.e., without video recording, or with recording solely for archiving purposes).

The SCORHE methods used to analyze the singly-house mouse videos, though simple in nature, have an accuracy comparable to that of known academic and commercial systems such as HomeCageScan for the same measures. The mouse limb placement confusion matrix as shown in FIG. 13 reveals the highest error rate as that of misclassifying a mouse on its hind legs as being on the cage floor. The majority of misclassifications between these two placement classes result from mouse partial rearings (i.e., when the mouse exhibits a partially elevated bipedal stance). During these slight partial rearings, the features set derived from the segmentation results proved insufficient to discriminate the two placement classes. Improved SCORHE algorithms, such as augmenting the features set, are likely to make the two cases separable.

Providing a mouse distance travelled measure is mostly found in monitoring systems with a top-down camera perspective such as the PhenoTyper. The SCORHE validation system enabled development of an estimation method for coordinates when processing single-mouse video from SCORHE enclosure 100s. The distance estimates, presently, are limited to motion in one of two planes: the cage floor and the cage ceiling. If a mouse while on its hind legs moves such that its centroid follows a non-straight path, only the difference between the end points of the contour contribute to the distance total. No rigorous method is presented here to ascertain the error resulting from approximating the length of the mouse motion path by the straight-line distance between corresponding on-floor or on-ceiling end points. However, manual visual inspection of segmented SCORHE videos indicates the motion of the mouse centroid while in a bipedal stance is well accounted for by the aforementioned method.

The SCORHE video analysis for doubly-housed mice confirms the circadian activity correlation to the vivarium diurnal cycle, as shown in FIG. 20, as well as a diminished activity level due sedation, as shown in FIG. 21. Furthermore, the results of the HMGN1 comparison, as shown in FIG. 22 are in agreement with reported results for short monitoring durations (i.e., ½ hour) using a commercial system. Both our present studies and the previous analysis indicate that the activity levels of HMGN1 OE mice are significantly higher than those of wild type controls. Further confidence is gained by manual viewing of the video to confirm higher mouse activity in dark versus light cycles, as well as in control versus sedated or over-expresser mice. The SCORHE algorithm output measures (e.g. occurrence of a rearing event, a side-to-side crossing event, or incrementing the inactivity count) were also overlaid as text labels on the processed video clips to facilitate a manual visual check on the accuracy of the measures. The visual checks qualitatively validate the algorithm rather than rigorously establish error bounds. These annotated video clips also proved useful during troubleshooting and optimization efforts associated with SCORHE algorithm development. Additional development effort, beyond the initial demonstration of adequacy of the SCORHE video for processing, is warranted to enhance the characterization of behavior in the case of doubly-housed mice.

Additional features and elements of the present disclosure including methods, process, and/or other steps of video processing are disclosed in the attached Appendix. The contents of which are also incorporated into the written description in its entirety.

Those skilled in the art will appreciate that variations from the specific embodiments disclosed above are contemplated by the invention. The invention should not be restricted to the above embodiments, but should be measured by the following claims.

What is claimed is:

1. A system for monitoring an animal in a home cage, the system comprising:
 a home cage enclosure to enclose the home cage; where the home cage enclosure comprises:
  a door hingedly engaged to a first end of a sidewall of the home cage enclosure;
  a front camera comprising a first lens, wherein the front camera is mounted on the door;
  a rear camera comprising a second lens and the rear camera mounted on a rear wall of the home cage enclosure, where the rear wall is engaged to a second end of the sidewall wherein the second end is opposite the first end;
  at least one near-infrared light source; and
  a light diffuser.

2. The system for monitoring an animal in a home cage of claim 1, where the home cage enclosure further comprises:
 another sidewall disposed generally parallel to the sidewall; and
 a bottom surface.

3. The system for monitoring an animal in a home cage of claim 1, wherein the light diffuser is positioned proximal to the at least one near-infrared light source, such that light emanating from the at least one near-infrared light source is diffused.

4. The system for monitoring an animal in a home cage of claim 1, where at least one of the front camera and the rear camera is configured to transmit data.

5. The system for monitoring an animal in a home cage of claim 1, where the door of home cage enclosure further comprises at least one window.

6. The system for monitoring an animal in a home cage of claim 5, where the at least one window comprises a transparent material.

7. The system for monitoring an animal in a home cage of claim 1, wherein when a home cage is disposed within the home cage enclosure the front camera is proximal to a front wall of the home cage and the rear camera is proximal to a rear wall of the home cage.

8. The system for monitoring an animal in a home cage of claim 7, wherein the front camera and the rear camera are positioned near a top portion of the front wall of the home cage and rear wall of the home cage, respectively.

9. The system for monitoring an animal in a home cage of claim 1, wherein the at least one near-infrared light source is disposed between the light diffuser and another light diffuser arranged in parallel, and open ends between the light diffuser and the other light diffuser are sealed by one or more light-sealing covers to form a near-infrared panel assembly.

10. The system for monitoring an animal in a home cage of claim 9, wherein the sidewall comprises the near-infrared panel assembly.

11. The system for monitoring an animal in a home cage of claim 1, wherein the at least one near-infrared light source comprises a printed circuit board in communication with at least one of a high-flux light emitting diode (LED) strip or an LED array.

12. The system for monitoring an animal in a home cage of claim 1, where at least one of the front camera and the rear camera further comprise a light blocking filter.

13. The system for monitoring an animal in a home cage of claim 12, where the light blocking filter blocks visible light.

14. The system for monitoring an animal in a home cage of claim 1, where the home cage enclosure is disposed in a cage rack.

15. The system for monitoring an animal in a home cage of claim 14, wherein the cage rack comprises a shelf to receive the home cage, and wherein the home cage enclosure is dimensioned to enclose the home cage positioned on the shelf of the cage rack.

16. The system of claim 1 further comprising:
 a computing device having at least one processor and memory;
 a data storage system; and
 the at least one processor programmed to:
  receive video data recorded by the front and rear cameras;
  segment the video data to identify at least one object in the video data;
  combine the video data from the front camera and the rear camera;
  determine a first classification for a first position of the object at a first time;
  determine a second classification for a second position of the object at a second time; and
  generate behavioral data, wherein the behavioral data indicates a behavior of the object based on the first and second classification.

17. A method for monitoring an animal in a home cage, the method comprising:
 disposing a home cage within a home cage enclosure comprising:
  a door hingedly;
  at least one sidewall of the home cage enclosure;
  a front camera comprising a first lens and the front camera is mounted on to the door;
  a rear camera comprising a second lens and the rear camera engaged to a rear wall of the home cage enclosure, where the rear wall is engaged to the at least one sidewall and disposed opposite the door;
  at least one near-infrared light source; and
  a light diffuser;
 receiving video data from the front and rear cameras at a least one processor;
 segmenting the video data to identify at least one object in the video data at least one processor;
 combine the video data from the front camera and the rear camera with the at least one processor;
 determine a first classification for a first position of the object at a first time with the at least one processor;
 determine a second classification for a second position of the object at a second time with the at least one processor; and
 generate behavioral data, wherein the behavioral data indicates a behavior of the object based on the first and second classification with the at least one processor.

18. A method for monitoring two or more animals in a home cage within a home cage enclosure comprising at least one near-infrared light source and a light diffuser; the home cage enclosure further comprising a door hingedly engaged to a first end of a sidewall of the home cage enclosure, a front camera comprising a first lens, wherein the front camera is mounted on the door, a rear camera comprising a second lens and the rear camera mounted on a rear wall of the home cage enclosure, where the rear wall is engaged to a second end of the sidewall, wherein the second end is opposite the first end, the method comprising:

receiving video data from two or more cameras at a least one processing system;

identifying an overlapping region of the home cage in the video data from each of the two or more cameras, wherein the overlapping region is a region of the home cage in the field of view of each of the two or more cameras;

identifying a non-overlapping region of the home cage in the video data from each of the two or more cameras, wherein the non-overlapping region is a region of the home cage not in the field of view for at least one of the two or more cameras;

determining if the at least one object is in the overlapping region;

segmenting the video data to identify a plurality of objects in the video data from each of the two or more cameras;

when a first object of the plurality of objects is in the overlapping region, identifying the first object as a same animal in the video data for each of the two or more cameras;

when the first object of the plurality of objects is a first non-overlapping region and a second object of the plurality of objects is in a second non-overlapping region, identifying the first object and the second object as different animals; and counting a total number of objects in the video data;

determining if an occlusion exists;

when an occlusion exists, resolving the occlusion by:

searching for a corner point of a suspect object, identifying significant inward dents in the suspect object blob contour;

passing a line through the corner point and parallel to a radial line of a circle centered at a centroid of the suspect object;

identifying pixels on a first side of the line as a first animal; and identifying pixels on a second side of the line as a second animal.

* * * * *